US010387997B2

(12) United States Patent
Kasagi

(10) Patent No.: US 10,387,997 B2
(45) Date of Patent: Aug. 20, 2019

(54) INFORMATION PROCESSING DEVICE, INFORMATION PROCESSING METHOD, AND STORAGE MEDIUM

(71) Applicant: FUJITSU LIMITED, Kawasaki-shi, Kanagawa (JP)

(72) Inventor: Akihiko Kasagi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 145 days.

(21) Appl. No.: 15/790,105

(22) Filed: Oct. 23, 2017

(65) Prior Publication Data

US 2018/0150934 A1 May 31, 2018

(30) Foreign Application Priority Data

Nov. 28, 2016 (JP) ................................ 2016-230619

(51) Int. Cl.

*G06T 3/40* (2006.01)
*G06T 7/13* (2017.01)
*G06F 17/17* (2006.01)
*G06T 5/20* (2006.01)

(52) U.S. Cl.

CPC ............ *G06T 3/4007* (2013.01); *G06F 17/17* (2013.01); *G06T 3/403* (2013.01); *G06T 3/4053* (2013.01); *G06T 5/20* (2013.01); *G06T 7/13* (2017.01); *G06T 2207/20192* (2013.01)

(58) Field of Classification Search

CPC ....... H04N 1/393; G06T 3/403; G06T 3/4007; G06T 3/4053; G06T 7/13; G06T 5/20; G06T 2207/20192; G06F 17/17

USPC ................................................. 382/199, 300

See application file for complete search history.

(56) References Cited

U.S. PATENT DOCUMENTS 8,538,203 B2 * 9/2013 Pan ...................... G06T 3/4007 348/240.99
2011/0199394 A1 * 8/2011 Toraichi ................. G06T 3/403 345/671
2012/0195518 A1 * 8/2012 Chen ................. H04N 5/23229 382/254

(Continued)

FOREIGN PATENT DOCUMENTS

GB 2297216 7/1996
JP 8-251400 9/1996

(Continued)

*Primary Examiner* — Daniel G Mariam
(74) *Attorney, Agent, or Firm* — Fujitsu Patent Center

(57) ABSTRACT

An information processing device includes a first memory and a processor. The processor includes a circuit and a second memory. The circuit calculates a first value from a plurality of third pixels that are located above an interpolation pixel from among a plurality of first pixels, calculates a second value from a plurality of fourth pixels that are located above the interpolation pixel from among an plurality of second pixels, calculates a third value from a plurality of fifth pixels that are located below the interpolation pixel, calculates a fourth value from a plurality of sixth pixels that are located below the interpolation pixel, calculates a first gradient value from the first and third values, calculates a second gradient value from the second and fourth values, determines an edge direction according to the first gradient value and the second gradient value, and calculates a pixel value of an interpolation pixel.

9 Claims, 21 Drawing Sheets

(56) References Cited

U.S. PATENT DOCUMENTS

| | | | | |
|---|---|---|---|---|
| 2015/0288851 | A1* | 10/2015 | Takashima | H04N 5/142<br>382/298 |
| 2016/0247262 | A1* | 8/2016 | Li | G06T 3/4007 |

FOREIGN PATENT DOCUMENTS

| | | |
|---|---|---|
| JP | 2007-065039 | 3/2007 |
| JP | 2010-039672 | 2/2010 |

* cited by examiner

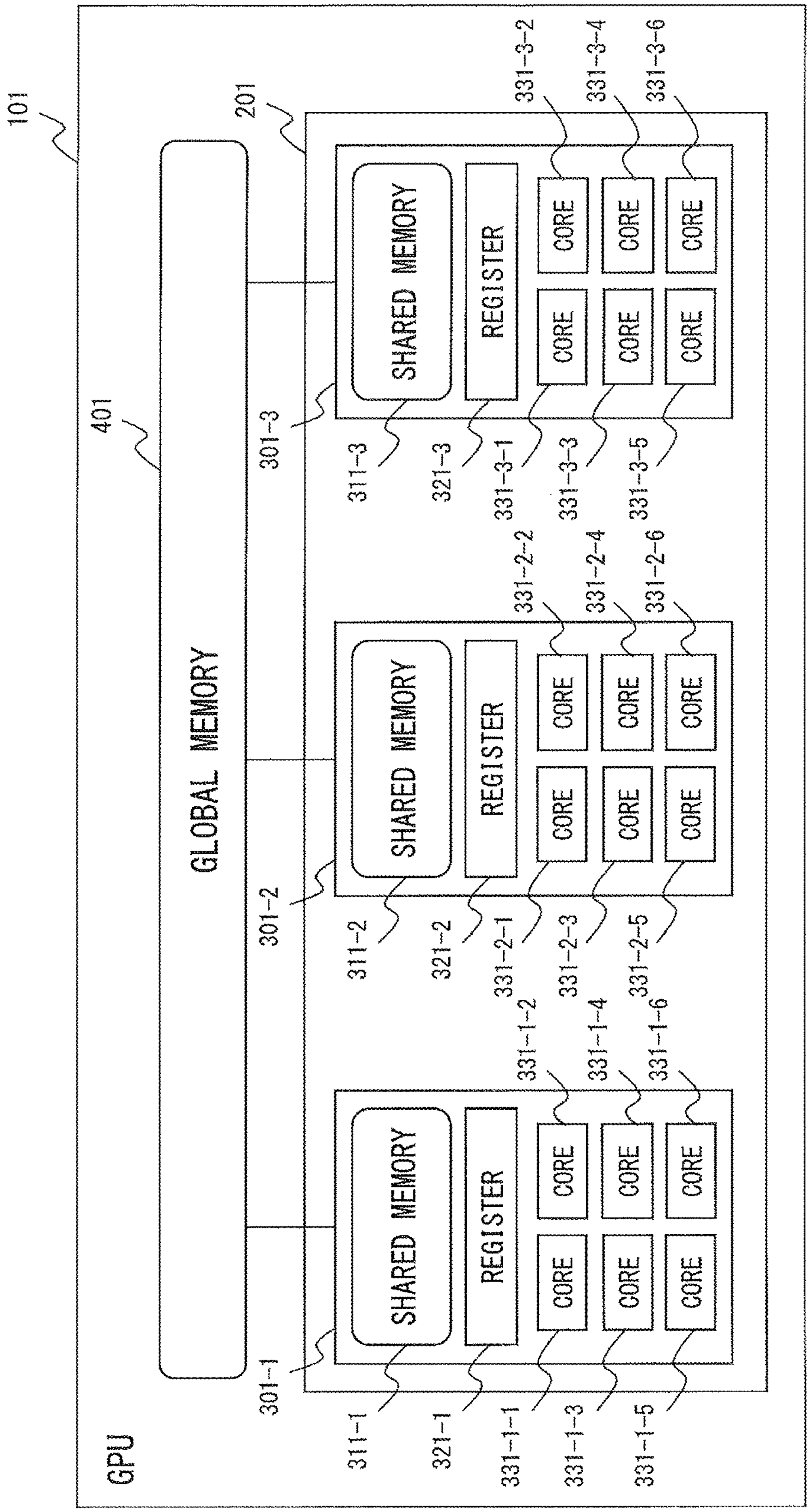
F I G. 1

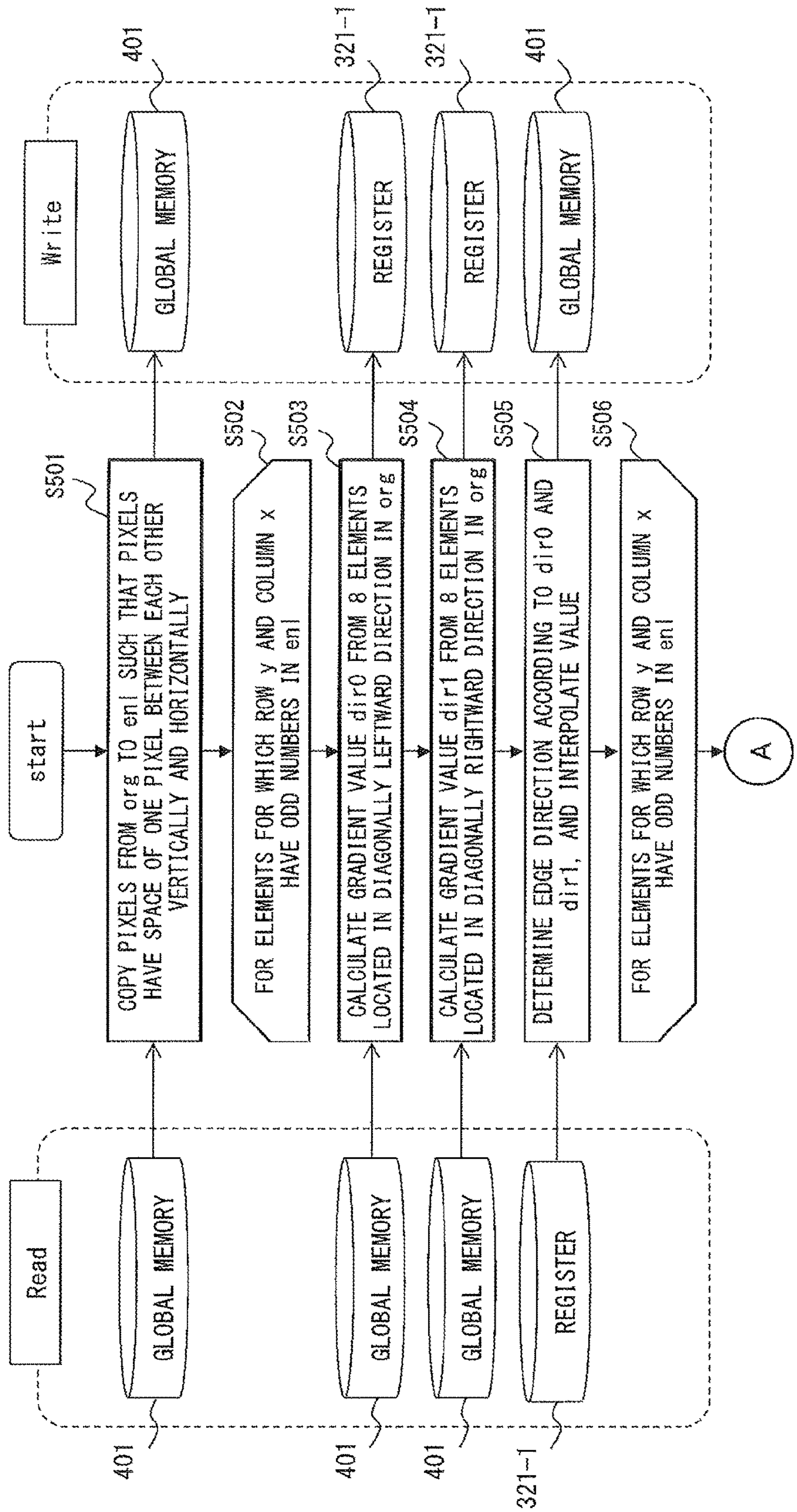
F I G. 2 A

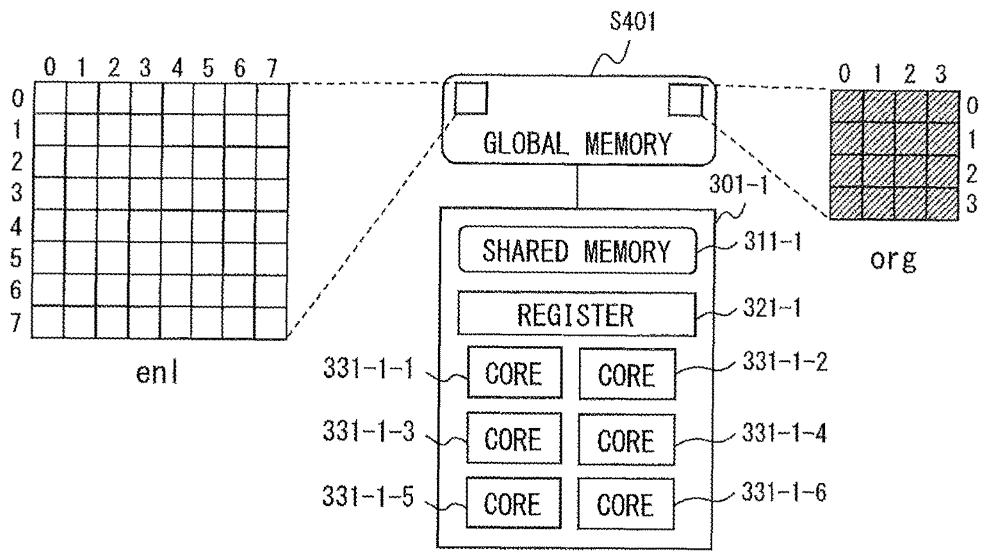
F I G. 3

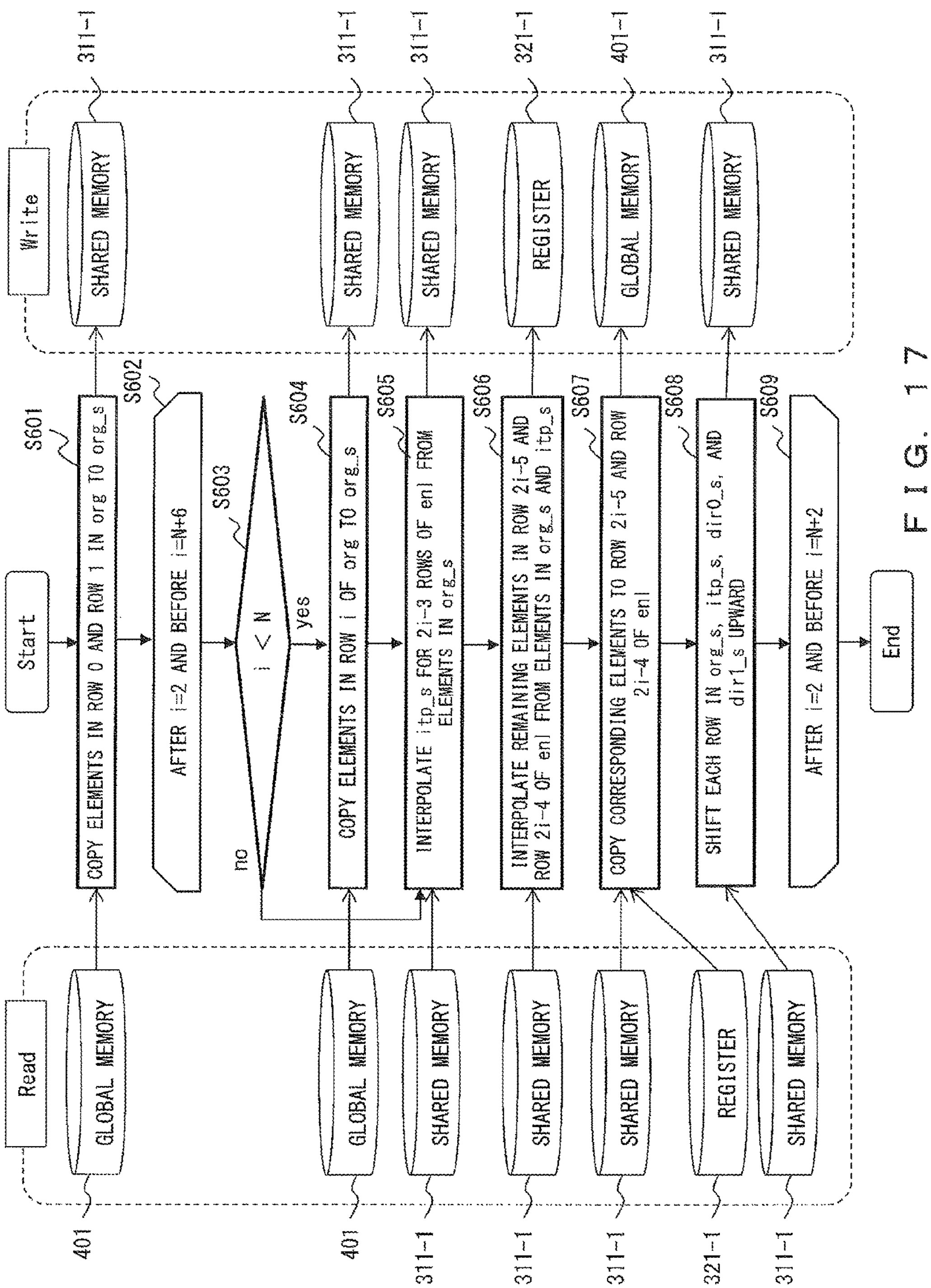
F I G . 17

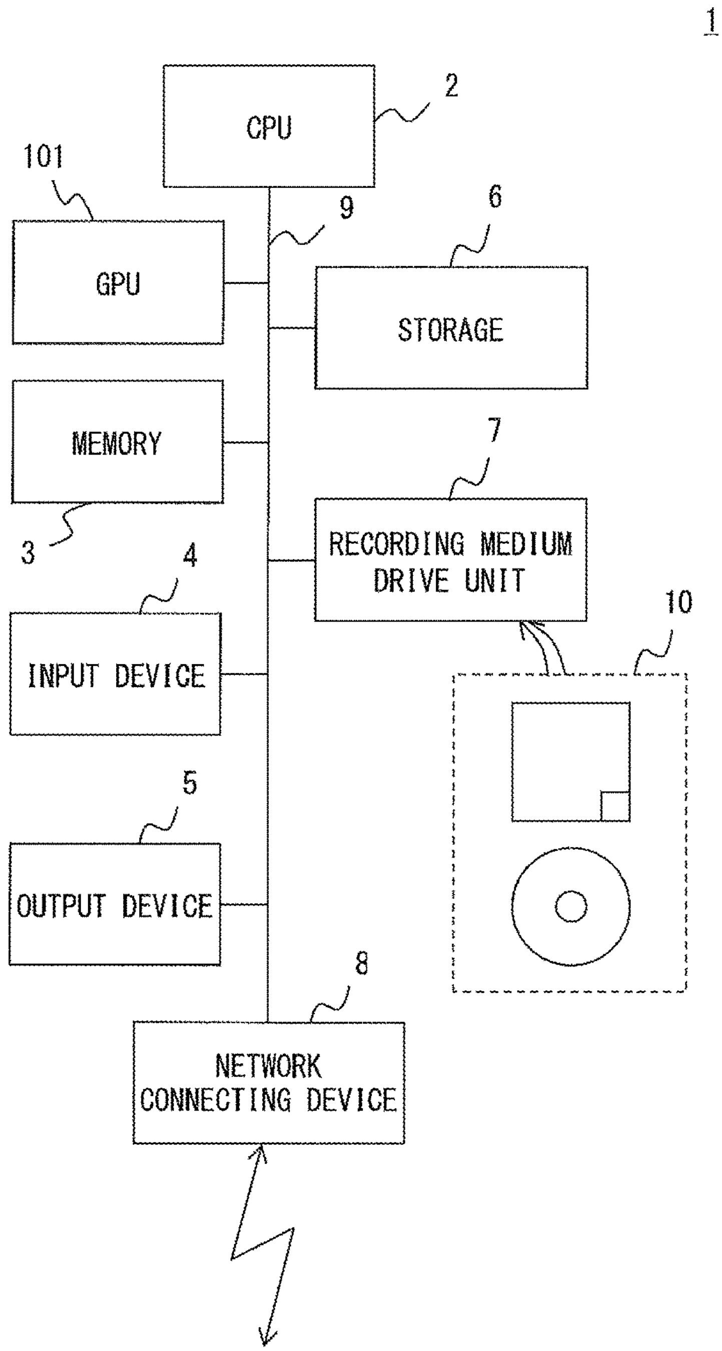
F I G. 2 0

INFORMATION PROCESSING DEVICE, INFORMATION PROCESSING METHOD, AND STORAGE MEDIUM

CROSS-REFERENCE TO RELATED APPLICATION

This application is based upon and claims the benefit of priority of the prior Japanese Patent Application No. 2016-230619, filed on Nov. 28, 2016, the entire contents of which are incorporated herein by reference.

FIELD

The embodiments discussed herein are related to an information processing device, an information processing method, and a storage medium.

BACKGROUND

As an algorithm for enlarging an image so as to generate an enlarged image, fast curvature-based interpolation (FCBI), bicubic interpolation, new edge-directed interpolation (NEDI), and the like are known.

FCBI is an algorithm for performing image enlargement in which an input image is enlarged. Interpolation is performed in consideration of the edge direction of an image, and therefore image enlargement whereby an edge is not crushed can be performed.

In processing for generating an enlarged image, a graphics processing unit (GPU) maybe used instead of a central processing unit (CPU) in order to perform high-speed processing.

An image enlarging device is known that is capable of generating a satisfactory enlarged image without increasing blurring or generating an isolated point (see, for example, Patent Document 1).

The GPU has a hierarchical memory structure. As an example, the GPU includes a global memory having a slow access speed, a shared memory that has an access speed higher than the speed of the global memory, and a register that has an access speed higher than the speed of the global memory.

In a case in which the GPU generates an enlarged image by using FCBI, when a pixel value of an interpolation pixel of the enlarged image is calculated, many pieces of data are obtained from a global memory in which an image to be enlarged has been stored in order to calculate a gradient value used to determine the direction of an edge. Therefore, there is a problem wherein it takes time to generate the enlarged image.

[Patent Document 1] Japanese Laid-open Patent Publication No. 2010-39672

[Patent Document 2] Japanese Laid-open Patent Publication No. 2007-65039

[Patent Document 3] Japanese Laid-open Patent Publication No. 8-251400

SUMMARY

According to an aspect of the invention, an information processing device includes a first memory that stores an original image and an enlarged image obtained by enlarging the original image, and a processor.

The processor includes: an arithmetic circuit that calculates a first gradient value used to determine an edge direction of an interpolation pixel within the enlarged image from respective pixel values of a plurality of first pixels in the original image, and calculates a second gradient value used to determine the edge direction from respective pixel values of a plurality of second pixels in the original image; and a second memory that stores the first gradient value and the second gradient value.

The arithmetic circuit reads the original image in prescribed data units from the first memory, and calculates a first value from respective pixel values of a plurality of third pixels that are located above the interpolation pixel from among the plurality of first pixels, when the plurality of third pixels are read.

The arithmetic circuit calculates a second value from respective pixel values of a plurality of fourth pixels that are located above the interpolation pixel from among the plurality of second pixels, when the plurality of fourth pixels are read.

After calculating the first value and the second value, the arithmetic circuit reads a plurality of pixels in the original image that are located below the interpolation pixel in the prescribed data units from the first memory.

The arithmetic circuit calculates a third value from respective pixel values of a plurality of fifth pixels that are located below the interpolation pixel from among the plurality of first pixels, when the plurality of fifth pixels are read.

The arithmetic circuit calculates a fourth value from respective pixel values of a plurality of sixth pixels that are located below the interpolation pixel from among the plurality of second pixels, when the plurality of sixth pixels are read.

The arithmetic circuit calculates the first gradient value by adding the third value to the first value, and calculates the second gradient value by adds the fourth value to the second value.

The arithmetic circuit determines the edge direction according to the first gradient value and the second gradient value, and calculates the pixel value of the interpolation pixel according to the edge direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A and 2B are a flowchart of FCBI processing using a conventional gradient value calculation method.

FIG. 3 illustrates an original image and an enlarged image that are stored in a global memory.

FIG. 10 illustrates FCBI processing using the conventional gradient value calculation method.

FIG. 17 is a flowchart of FCBI using the gradient value calculation method according to the embodiment.

FIG. 20 is a block diagram of an information processing device (a computer).

DESCRIPTION OF EMBODIMENTS

An embodiment is described below with reference to the drawings.

Figure 1:
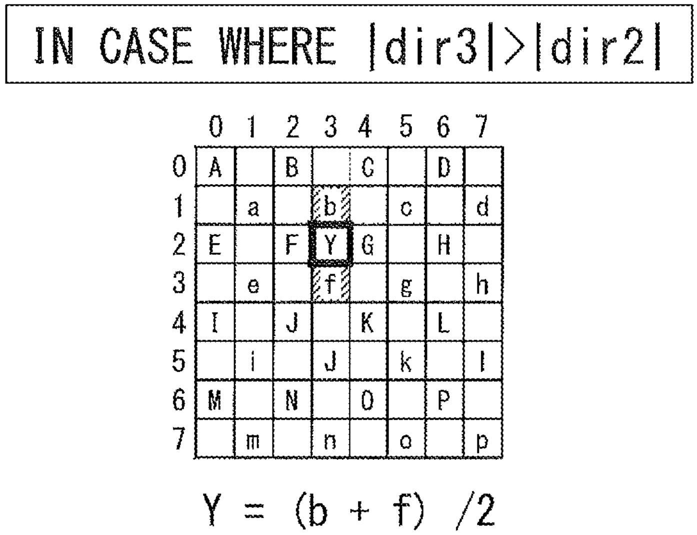
FIG. 1 is a block diagram of a GPU according to an embodiment.

FIG. 1 is a block diagram of a GPU according to the embodiment.

A GPU 101 according to the embodiment includes a chip 201 and a global memory 401. The GPU 101 is equipped, for example, in a computer such as a personal computer, a server, and the like. Data or an instruction is input to the GPU 101, for example, from a central processing unit (CPU) of a computer, and the GPU 101 processes the data, and outputs a processing result. The GPU 101 is an example of an information processing device.

The chip 201 includes arithmetic processors 301-*i* (i=1 to 3). The number of arithmetic processors 301-*i* is an example, and is not limit to this. The chip 201 is, for example, a large-scale integrated circuit (LSI).

The arithmetic processor 301-*i* performs various types of processing such as image processing or arithmetic processing, and the arithmetic processor 301-*i* is connected to the global memory 401 via a bus so as to be able to read or write data stored in the global memory 401. The arithmetic processor 301-*i* is, for example, a streaming multiprocessor (SM). The arithmetic processor 301-*i* includes a shared memory 311-*i*, a register 321-*i*, and a core 331-*i*-*j* (j=1 to 6).

The shared memory 311-*i* is a storage that stores data. The access speed of the shared memory 311-*i* is higher than the access speed of the global memory 401, and is lower than the access speed of the register 321-*i*. In addition, the storage capacity of the shared memory 311-*i* is smaller than the storage capacity of the global memory 401.

The register 321-*i* is a storage that stores data. The access speed of the register 321-*i* is higher than the access speed of the shared memory 311-*i*.

The core 331-*i*-*j* is an arithmetic device that performs various types of processing such as image processing or arithmetic processing. The core 311-*i*-*j* is an example of an arithmetic circuit.

The global memory 401 is a storage that stores data. The global memory 401 is, for example, a dynamic random access memory (DRAM). The global memory 401 is located outside the arithmetic processor 301-*i* (an off-chip), and the global memory 401 is connected to the arithmetic processor 301-*i* via a bus. The capacity of the global memory 401 is larger than the capacity of the shared memory and the capacity of the register. The access speed of the global memory 401 is lower than the access speed of the shared memory and the access speed of the register.

FCBI processing using a conventional gradient value calculation method is described here.

Figure 2B:
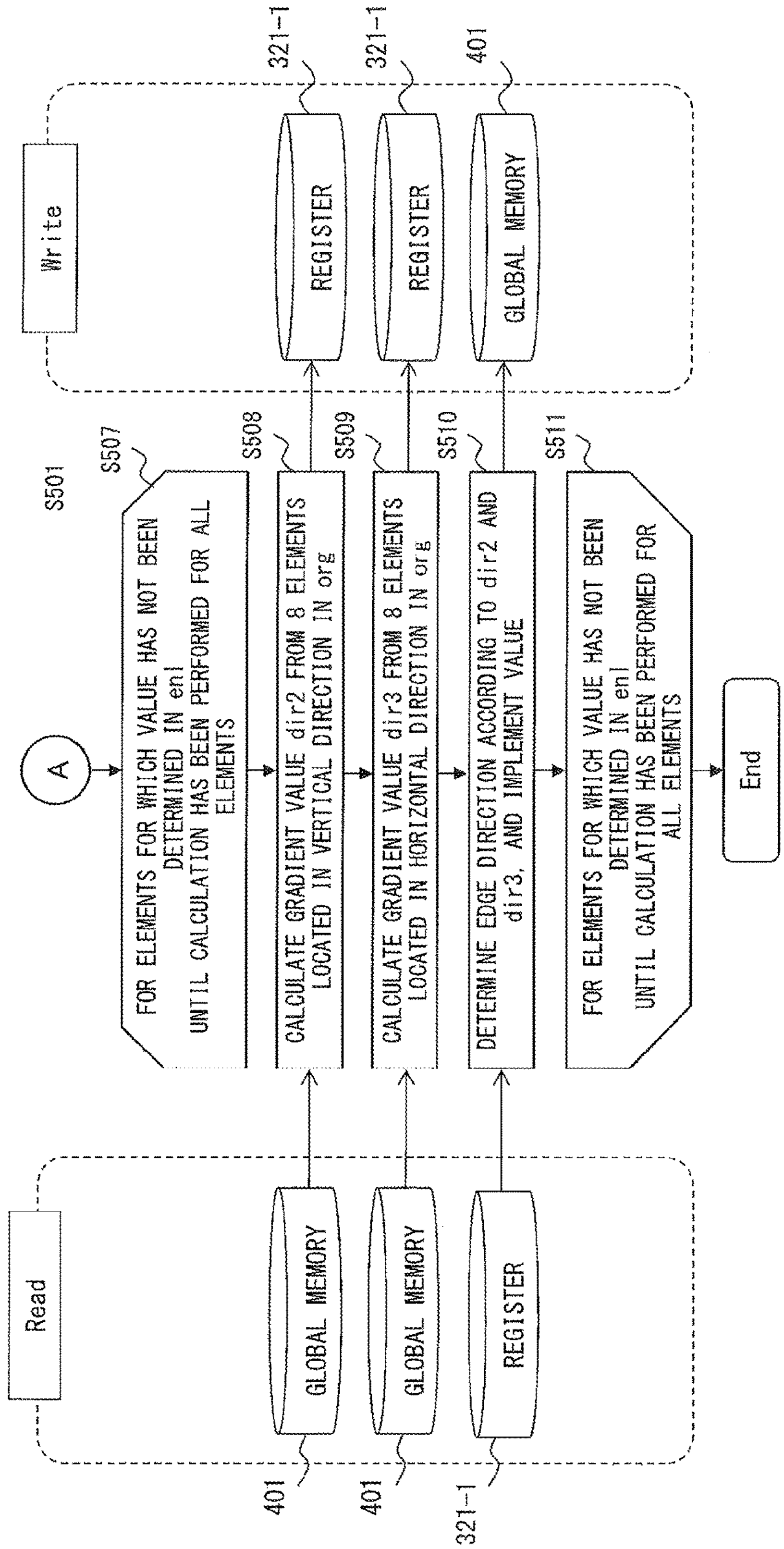

FIGS. 2A and 2B are a flowchart of the FCBI processing using the conventional gradient value calculation method.

FIG. 3 illustrates an original image and an enlarged image that are stored in a global memory.

FIG. 4 to FIG. 9 illustrate the FCBI processing using the conventional gradient value calculation method.

Here, assume that an arithmetic processor 301-1 performs FCBI processing. The global memory 401 stores an image (an original image) org to be enlarged, and an enlarged image en1 obtained by enlarging the original image org (FIG. 3). Assume that the size of the original image org is N pixels in height and M pixels in width (the same is applied to the embodiment described below). Also assume that the size of the enlarged image en1 is 2N pixels in height and 2M pixels in width (the same is applied to the embodiment described below). In FIG. 3, the size of the original image is 4×4 pixels, and the size of the enlarged image en1 is 8×8 pixels. In an initial state, the pixel value of each of the pixels (elements) of the enlarged image en1 is blank.

Assume that the top rows of the original image org and the enlarged image en1 are the 0th rows. Also assume that rows at the left-hand ends of the original image org and the enlarged image en1 are the 0th columns.

In step S501, a core 331-1-*j* copies respective pixels of the original image org to the enlarged image en1 in such a way that the respective pixels have a space of one pixel between each other vertically and horizontally.

Figure 4:
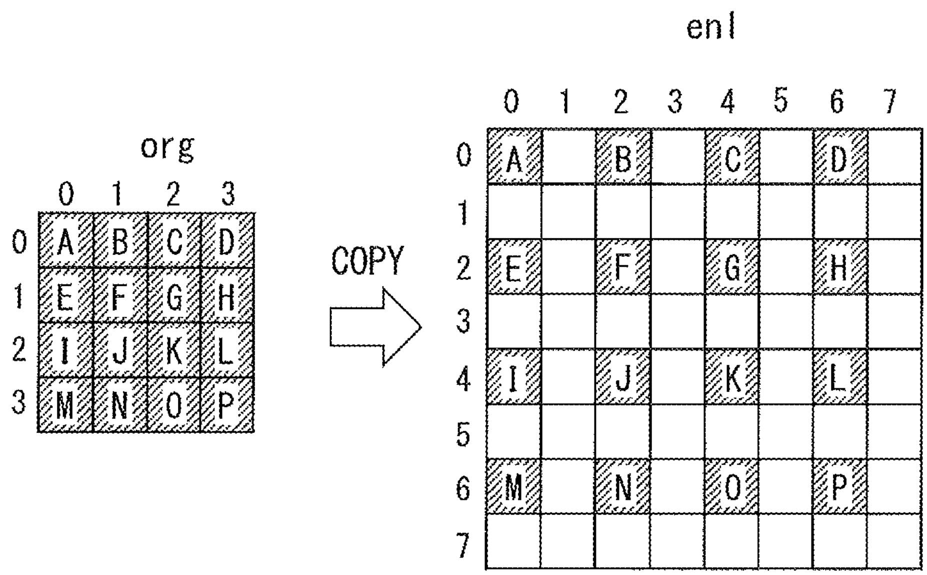
FIG. 4 illustrates FCBI processing using the conventional gradient value calculation method.

As illustrated in FIG. 4, pixels in the 0th to 3rd columns of the 0th row of the original image org are referred to as pixels A to D, respectively. Pixels in the 0th to 3rd columns of the 1st row of the original image org are referred to as pixels E to F, respectively. Pixels in the 0th to 3rd columns of the 2nd row of the original image org are referred to as pixels I to L, respectively. Pixels in the 0th to 3rd columns of the 3rd row of the original image org are referred to as pixels M to P, respectively. Further, the pixel values of pixels A to P are A to P, respectively.

As a result of the process of step S501, a pixel at the coordinates (i,j) (i=0 to 3, j=0 to 3) in the original image org becomes a pixel at the coordinates (2i,2j) in the enlarged image, as illustrated in FIG. 4.

Step S502 is a start end of a loop that corresponds to step S506, and one not-yet-selected pixel is selected from pixels for which both coordinates of the coordinates (i,j) have odd numbers in the enlarged image en1. The selected pixel is referred to as a selected pixel.

In step S503, the core 331-1-*j* reads, from the global memory 401, 8 elements (pixels) that are located in a diagonally leftward direction (in upper-left and lower-right directions) with respect to the selected pixel in the enlarged image en1, and the core 331-1-*j* calculates a gradient value dir0 from the 8 read elements. The core 331-1-*j* stores the gradient value dir0 in the register 331-1. Assume that the coordinates of the selected pixel are (x,y). The coordinates of the 8 pixels that are located in the diagonally leftward direction (in the upper-left and lower-right directions) are (x−1,y−3), (x+1,y−1), (x+3,y+1), (x−1,y−1), (x+1,y+1), (x−3,y−1), (x−1,y+1), and (x+1,y+3), respectively. The gradient value dir0 is a value that is obtained by summing respective values obtained by multiplying the pixel values of (x−1,y−1) and (x+1,y+1) by −3 and the respective pixel values of (x−1,y−3), (x+1,y−1), (x+3,y+1), (x−3,y−1), (x−1, y+1), and (x+1,y+3).

In step S504, the core 331-1-*j* reads, from the global memory 401, 8 elements (pixels) that are located in a diagonally rightward direction (in upper-right and lower-left directions) with respect to the selected image in the enlarged image en1, and the core 331-1-*j* calculates a gradient value dir1 from the 8 read elements. The core 331-1-*j* stores the gradient value dir1 in the register 331-1. Assume that the coordinates of the selected pixel are (x,y). The coordinates of the 8 pixels that are located in the diagonally rightward direction (in the upper-right and lower-left directions) are (x−3,y+1), (x−1,y−1), (x+1,y−3), (x−1,y+1), (x+1,y−1), (x−1,y+3), (x+1,y+1), and (x+3,y−1), respectively. The gradient value dir1 is a value that is obtained by summing respective values obtained by multiplying the pixel values of (x−1,y+1) and (x+1,y−1) by −3 and the respective pixel values of (x−3,y+1), (x−1,y−1), (x+1,y−3), (x−1,y+3), (x+1, y+1), and (x+3,y−1).

Figure 5:
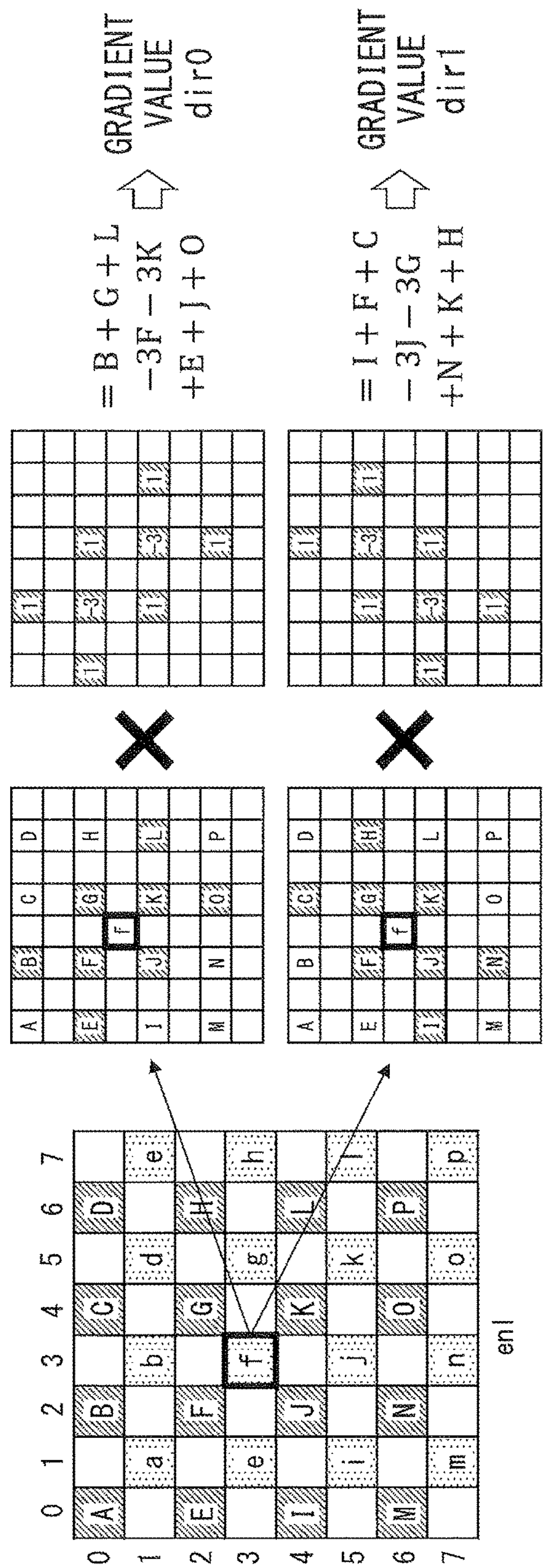
FIG. 5 illustrates FCBI processing using the conventional gradient value calculation method.

As illustrated in FIG. 5, assume that pixels in the 1st, 3rd, 5th, and 7th columns of the 1st row of the enlarged image en1 are respectively referred to as pixels a to d. Assume that pixels in the 1st, 3rd, 5th, and 7th columns of the 3rd row of the enlarged image en1 are respectively referred to as pixels e to h. Assume that pixels in the 1st, 3rd, 5th, and 7th columns of the 5th row of the enlarged image en1 are respectively referred to as pixels i to 1. Assume that pixels in the 1st, 3rd, 5th, and 7th columns of the 7th row of the enlarged image en1 are respectively referred to as pixels m to p. Further, assume that the pixel values of pixels a to p are respectively a to p.

As an example, a gradient value dir0 of pixel f is calculated by using pixels B, E, F, G, J, K, L, and O, which are located in a diagonally leftward direction (in upper-left and lower-right directions) with respect to pixel f. The gradient value dir0 of pixel f is calculated such that dir0=B+G+L−3F−3K+E+0.

In addition, a gradient value dir1 of pixel f is calculated by using pixels F, G, H, I, J, K, and N, which are located in a diagonally leftward direction (in upper-right and lower-left directions) with respect to pixel f. The gradient value dir1 of pixel f is calculated such that dir1=I+F+C−3J−3G+N+K+H.

In step S505, the core 331-1-*j* compares the absolute value of dir0 and the absolute value of dir1, and determines an edge direction according to a comparison result. When |dir0|>|dir1|, the core 331-1-*j* determines that the edge direction is the dir0 direction (upper-left and lower-right directions). When |dir1|>|dir0|, the core 331-1-*j* determines that the edge direction is the dir1 direction (upper-right and lower-left directions). The core 331-1-*j* calculates the pixel value of the selected pixel on the basis of the determined edge direction. The core 331-1-*j* stores the calculated pixel value of the selected pixel in the enlarged pixel en1 within the global memory 401.

Figure 6:
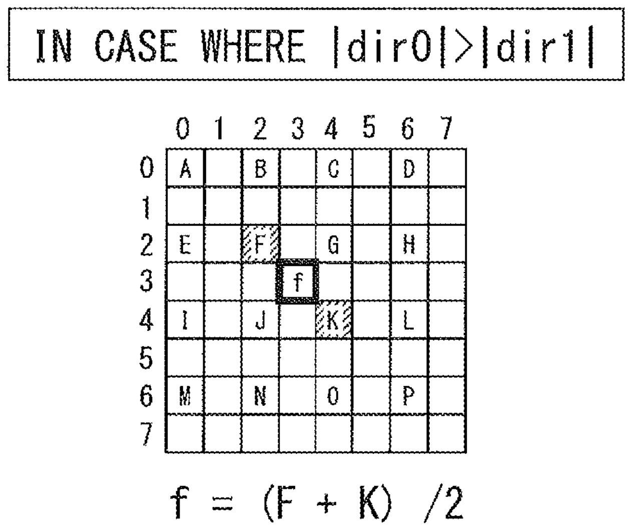
FIG. 6 illustrates FCBI processing using the conventional gradient value calculation method.

As illustrated in FIG. 6, when |dir0|>|dir1|, the edge direction is the dir0 direction (the upper-left and lower-right directions), and the pixel value of selected pixel f is an average of the pixel value of pixel F located on an upper-left side of selected pixel f and the pixel value of pixel K located on a lower-right side of selected pixel f; namely, f=(F+K)/2 is established.

Figure 7:
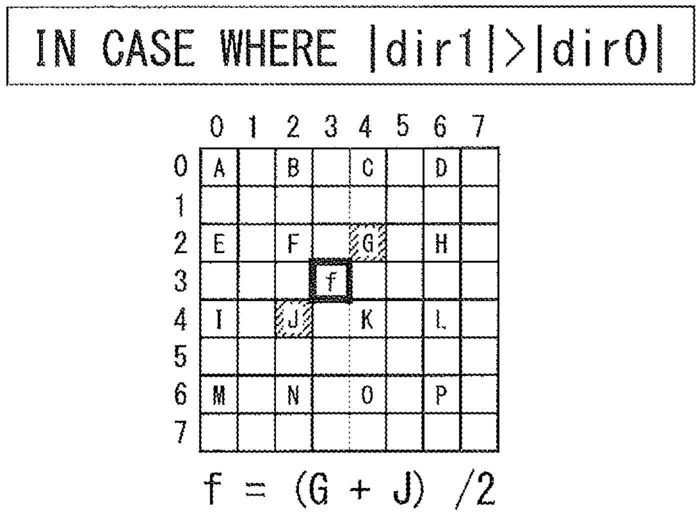
FIG. 7 illustrates FCBI processing using the conventional gradient value calculation method.

As illustrated in FIG. 7, when |dir|>|dir0|, the edge direction is the dir1 direction (the upper-right and lower-left directions), and the pixel value of selected pixel f is an average of the pixel value of pixel G located on an upper-right side of selected pixel f and the pixel value of pixel J located on lower-left side of selected pixel f; namely, f=(G+J)/2 is established.

In step S506, when all of the pixels for which both coordinates of the coordinates (i,j) have odd numbers in the enlarged image en1 have been selected, the control moves on to step S507. When there are any pixels that have not yet been selected from among the pixels for which both coordinates of the coordinates (i,j) have odd numbers in the enlarged image en1, the control returns to step S502.

Step S507 is a beginning of a loop that corresponds to step S511, and one pixel for which a pixel value has not yet been determined (pixels for which one coordinate of the coordinates (i,j) has an odd number and the other coordinate has an even number) in the enlarged image en1 is selected. The selected pixel is referred to as a selected pixel.

In step S508, the core 331-1-*j* reads, from the global memory 401, 8 elements (pixels) that are located in a horizontal direction with respect to the selected pixel in the enlarged image en1, and the core 331-1-*j* calculates a horizontal-direction gradient value dir2 on the basis of the 8 read elements. Assume that the coordinates of the selected pixel are (x,y). The coordinates of the 8 pixels that are located in the horizontal direction are (x−2,y−1), (x,y−1), (x+2,y−1), (x−1,y), (x+1,y), (x−2,y+1), (x,y+1), and (x+2, y+1), respectively. The horizontal-direction gradient value dir2 is a value that is obtained by summing respective values obtained by multiplying the pixel values of (x−1,y) and (x+1,y) by −3 and the respective values of (x−2,y−1), (x,y−1), (x+2,y−1), (x−2,y+1), (x,y+1), and (x+2,y+1).

In step S509, the core 331-1-*j* reads, from the global memory 401, 8 elements (pixels) that are located in a vertical direction with respect to the selected pixel in the enlarged image en1, and the core 331-1-*j* calculates a vertical-direction gradient value dir3 on the basis of the 8 read pixels. Assume that the coordinates of the selected pixel are (x,y). The coordinates of the 8 pixels that are located in the vertical direction are (x−1,y−2), (x−1,y), (x−1,y+2), (x,y−1), (x,y+1), (x+1,y−2), (x+1,y), and (x+1,y+2), respectively. The vertical-direction gradient value dir3 is a value that is obtained by summing respective values obtained by multiplying the pixel values of (x,y−1) and (x,y+1) by −3 and the pixel values of (x−1,y−2), (x−1,y), (x−1,y+2), (x+1, y−2), (x+1,y), and (x+1,y+2).

Figure 8:
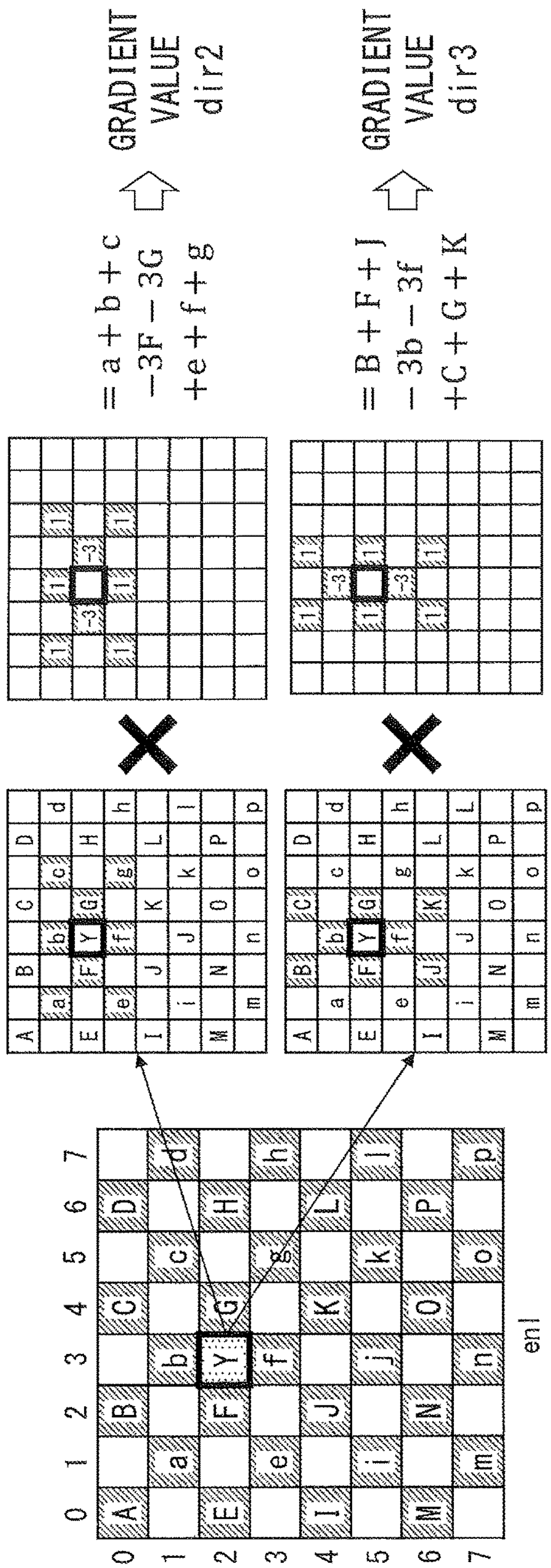
FIG. 8 illustrates FCBI processing using the conventional gradient value calculation method.

A case in which the pixel value of pixel Y at the coordinates (3,2) is calculated, as illustrated in FIG. 8, is described below.

The horizontal-direction gradient value dir2 of pixel Y is calculated by using pixels a, b, c, F, G, e, f, and g, which are located in a horizontal direction with respect to pixel Y. The horizontal-direction gradient value dir2 of pixel Y is calculated such that dir2=a+b+c−3F−3G+e+f+g.

The vertical-direction gradient value dir3 of pixel Y is calculated by using pixels B, F, J, b, f, C, G, and K, which are located in a vertical direction with respect to pixel Y. The vertical-direction gradient value dir3 of pixel Y is calculated such that dir3=B+F+J−3b−3f+C+G+K.

In step S510, the core 331-1-*j* compares the absolute value of dir2 and the absolute value of dir3, and determines an edge direction according to a comparison result. When |dir2|>|dir3|, the core 331-1-*j* determines that the edge direction is the dir2 direction (the horizontal direction). When |dir3|>|dir2|, the core 331-1-*j* determines that the edge direction is the dir3 direction (the vertical direction). The core 331-1-*j* calculates the pixel value of the selected pixel on the basis of the determined edge direction. The core 331-1-*j* stores the calculated pixel value of the selected pixel in the enlarged image en1 within the global memory 401.

Figure 9:
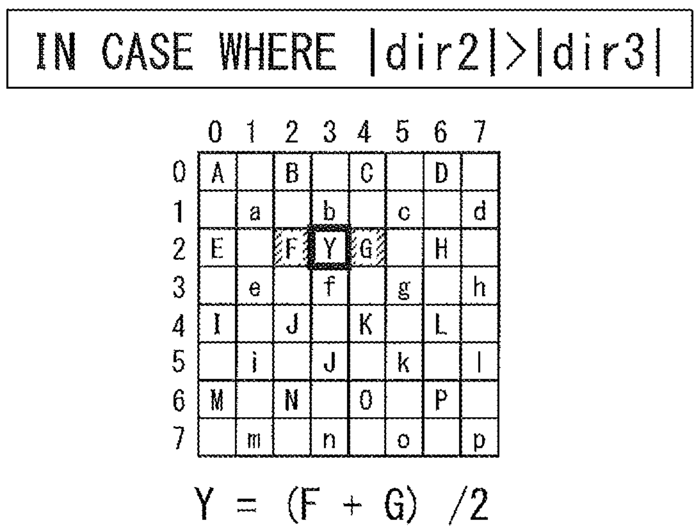
FIG. 9 illustrates FCBI processing using the conventional gradient value calculation method.

As illustrated in FIG. 9, when |dir2|>|dir3|, the edge direction is the dir2 direction (the horizontal direction), and the pixel value of selected pixel Y is an average of the pixel value of pixel F located on a left-hand side of selected pixel Y and the pixel value of pixel G located on a right-hand side of selected pixel Y; namely, Y=(F+G)/2 is established.

As illustrated in FIG. 10, when |dir3|>|dir2|, the edge direction is the dir3 direction (the vertical direction), and the pixel value of selected pixel Y is an average of the pixel value of pixel b located on an upper side of selected pixel Y and the pixel value of pixel f located on a lower side of selected pixel Y; namely, Y=(b+f)/2 is established.

Figure 11:
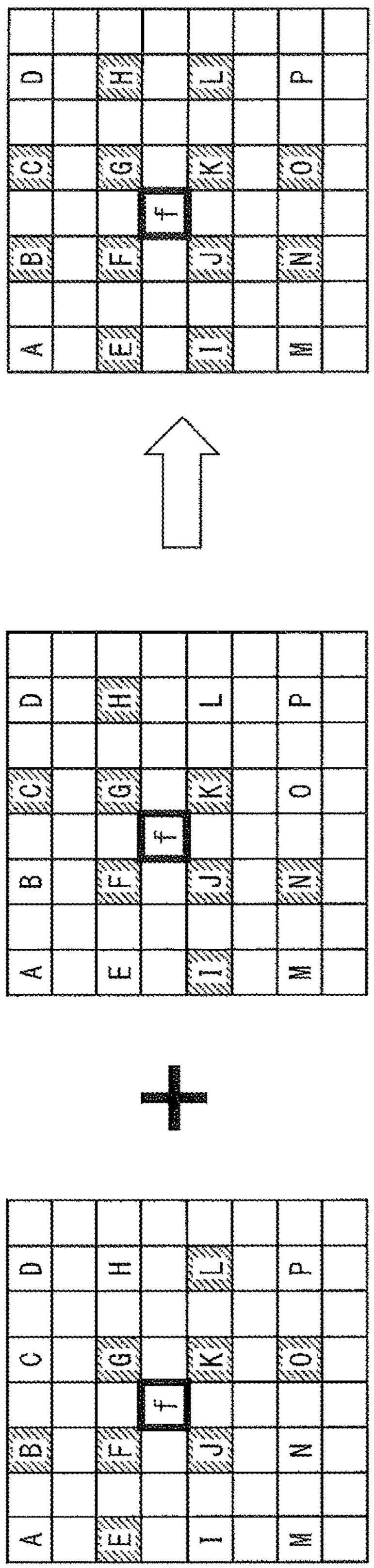
FIG. 11 illustrates pixels used to calculate the gradient value of pixel f.

FIG. 11 illustrates pixels used to calculate the gradient value of pixel f.

As described above, the gradient value dir0 of pixel f is calculated by using pixels B, E, F, G, J, K, L, and O. In addition, the gradient value dir1 of pixel f is calculated by using pixels C, F, G, H, I, J, K, and N.

In FCBI, the core 331-1-*j* obtains the pixel values of 8×2 pixels in order to interpolate one pixel. In FIG. 11, 4 pixels (pixels F, G, J, and K) of pixels obtained to calculate the gradient value of pixel f are common, and therefore at least the pixel values of 12 pixels need to be obtained for each single pixel.

In FCBI, the number of pixels in an enlarged image is four times the number of pixels in an original image, and therefore the pixel values of 3× (N×M) blank pixels need to be calculated. In FCBI using the conventional gradient value calculation method, 3×(N×M)×12 pixel values need to be read from the global memory. Accordingly, it takes time to generate an enlarged image.

In FCBI using the gradient value calculation method according to the embodiment, a gradient value calculation method using 12 pixels is transformed into a kernel using 5 pixels in which exactly the same value can be calculated such that an unneeded access amount per processing is reduced. In addition, in FCBI using the gradient value calculation method according to the embodiment, only actual data is stored such that consistency can be virtually obtained, and a pixel is interpolated by using a pipeline scheme. By doing this, the access to the global memory can be reduced to the reading of (N×M) elements and the writing of (2N×2M) elements, which are minimum needed accesses.

Figure 12:
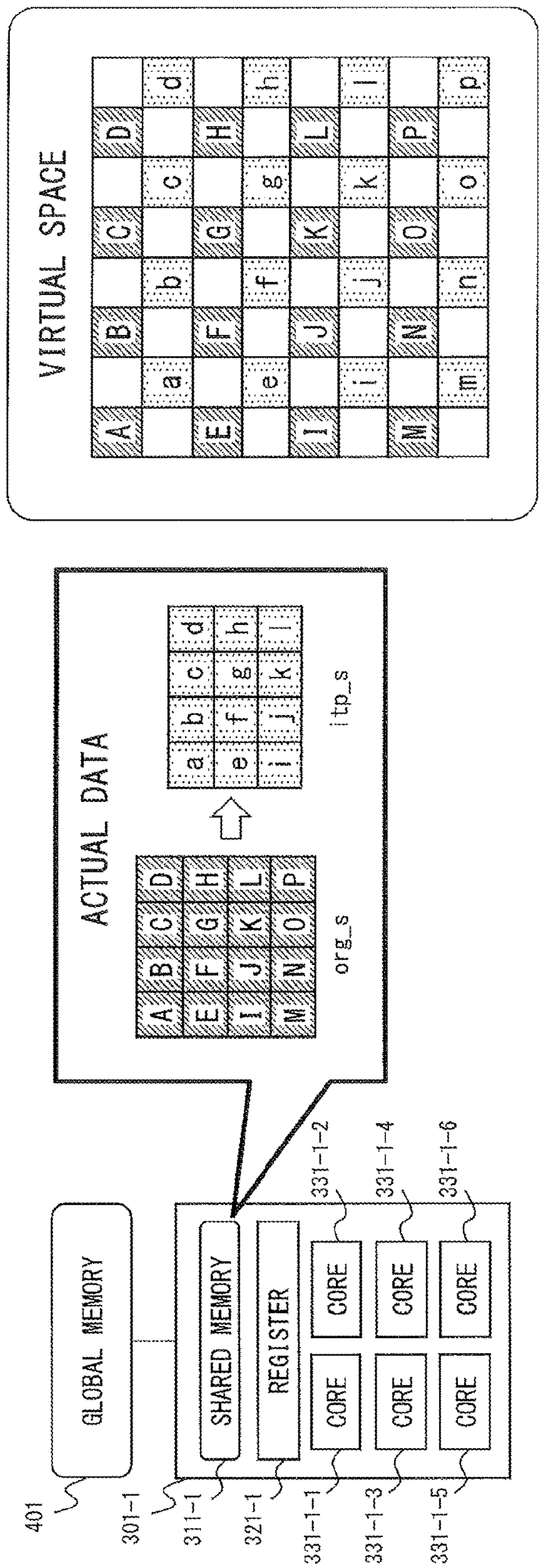
FIG. 12 illustrates an example of data stored in a shared memory.

FIG. 12 illustrates data stored in a shared memory.

In the gradient value calculation method according to the embodiment, the shared memory 311-1 stores, as actual data, only two pieces of data, data of an original image and data of pixels that are interpolated from pixels of the original image that are located in a diagonal direction in an enlarged image. By doing this, an amount of data to be substantially stored can be reduced. However, with just this, when a huge image is input, the huge image overflows from a small-capacity shared memory, and therefore, from among the data of the original image and the data of the pixels that are interpolated from the pixels of the original image that are located in the diagonal direction, only data needed for an arithmetic operation (a partial original image org_s and a partial interpolation pixel itp_s) is stored in the shared memory 311-1, as described below. An enlarged image that corresponds to the data of the original image and the data of the pixels that are interpolated from the pixels of the original image that are located in the diagonal direction is illustrated in a virtual space on a right-hand side of FIG. 12.

Figure 13:
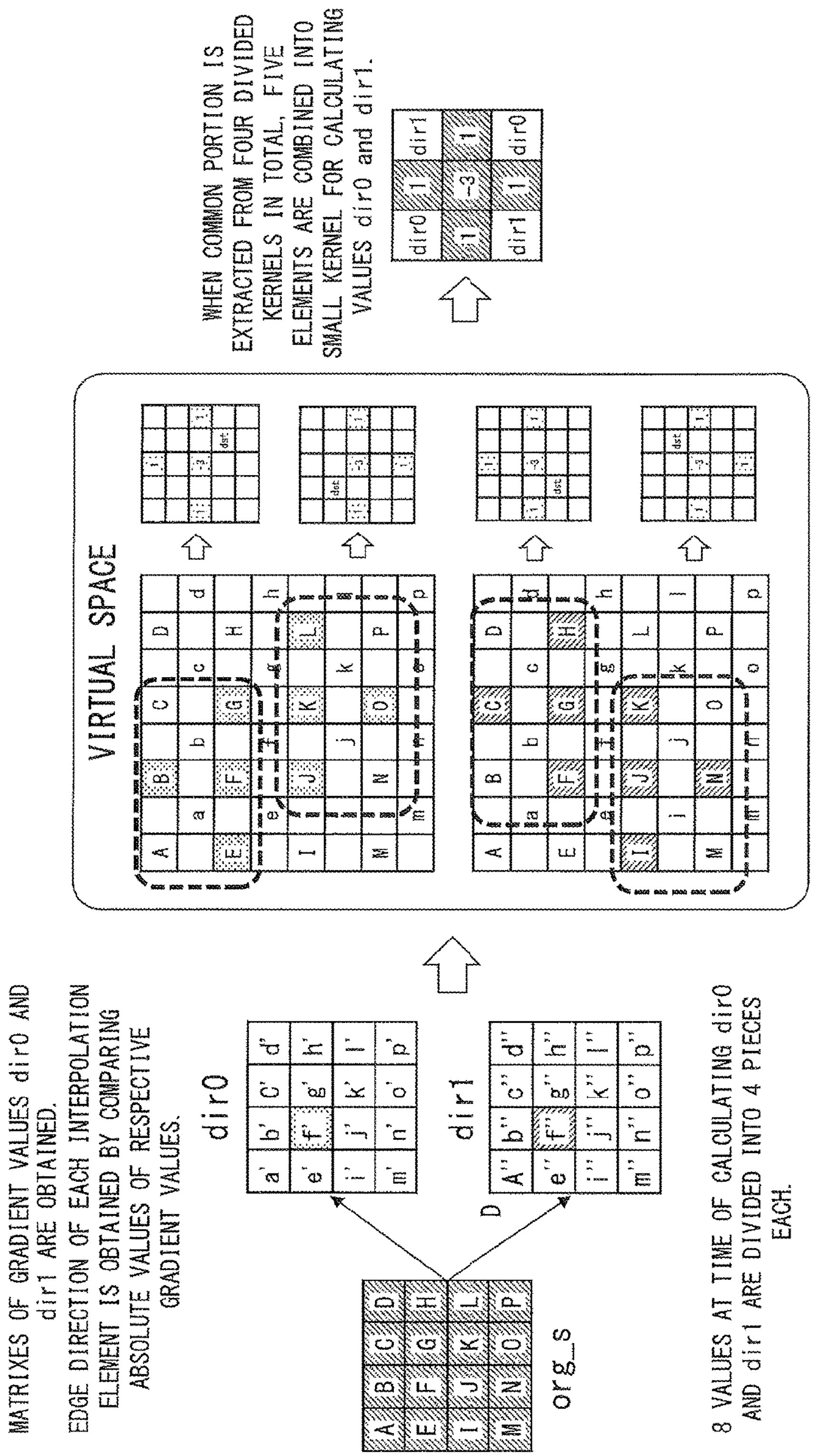
FIG. 13 illustrates a gradient value calculation method according to the embodiment.

FIG. 13 illustrates a gradient value calculation method according to the embodiment.

The gradient values dir0 of a diagonally leftward direction of interpolation pixels a to p in an enlarged image are respectively denoted by a' to p', and the gradient values dir1 of a diagonally rightward direction are respectively denoted by a" to p". In the embodiment, a matrix of the gradient values dir0 of the diagonally leftward direction, the matrix including a' to p' as elements, and a matrix of the gradient values dir1 of the diagonally rightward direction, the matrix including a" top" as elements, are obtained. The edge direction of each of the interpolation pixels can be calculated by comparing the absolute values of the gradient values dir0 and dir1 of each of the interpolation pixels.

As an example, a case in which the gradient values dir0 and dir1 of two directions of pixel f in the enlarged image are calculated is considered.

8 values at the time of calculating the gradient value dir0 of a diagonally leftward direction of pixel f and 8 values at the time of calculating the gradient value dir1 of a diagonally rightward direction of pixel f are divided into 4 values each.

The 8 values at the time of calculating the gradient value dir0 of the diagonally leftward direction are divided into B, E, F, and G, and J, K, L, and O. The 8 values at the time of calculating the gradient value dir1 of the diagonally rightward direction are divided into C, F, G, and H, and I, J, K, and N. Namely, four groups are formed.

As described above, the gradient value dir0 (=f') of the diagonally leftward direction of pixel f is calculated such that dir0=B+G+L−3F−3K+E+O. The gradient value dir0 of the diagonally leftward direction of pixel f is calculated by summing a value (dir0_1=−3F+B+E+G) that is calculated from pixels B, E, F, and G, which are located above pixel f in the enlarged image, and a value (dir0_0=−3K+J+L+O) that is calculated from pixels J, K, L, and O, which are located below pixel f.

In addition, the gradient value dir1 (=f") of the diagonally rightward direction of pixel f is calculated such that dir1=I+F+C−3J−3G+N+K+H. The gradient value dir1 of the diagonally rightward direction of pixel f is calculated by summing a value (dir1_1=−3G+C+F+H) that is calculated from pixels C, F, G, and H, which are located above pixel f in the enlarged image, and a value (dir1_0=−3J+I+K+N) that is calculated from pixels I, J, K, and N, which are located below pixel f.

When a common portion is extracted from four divided kernels in total, five elements can be combined into a small kernel for calculating the values dir0 and dir1.

In the embodiment, by using the kernel, a portion dir0_0 of the gradient value of the diagonally leftward direction of a pixel that is located on an upper-left side of a pixel in the enlarged image that corresponds to pixel z(i,j) in the partial original image is calculated by −3(i,j)+(i−1,j)+(i+1,j)+(i,j+1). Note that i and j are values of coordinates in the partial original image org_s.

In the embodiment, by using the kernel, a portion dir0_1 of the gradient value of the diagonally leftward direction of a pixel that is located on a lower-right side of a pixel in the enlarged image that corresponds to pixel z(i,j) in the partial original image is calculated by −3(i,j)+(i−1,j)+(i+1,j)+(i,j−1).

In the embodiment, by using the kernel, a portion dir1_0 of the gradient value of the diagonally rightward direction of a pixel that is located on an upper-right side of a pixel in the enlarged image that corresponds to pixel z(i,j) in the partial original image is calculated by −3(i,j)+(i−1,j)+(i+1,j)+(i,j+1). As described above, dir0_0 =dir1_0 is established, and therefore in practice, dir1_0 does not need to be calculated again.

In the embodiment, by using the kernel, a portion dir1_1 of the gradient value of the diagonally rightward direction of a pixel that is located on a lower-left side of a pixel in the enlarged image that corresponds to pixel z(i,j) in the partial original image is calculated by −3(i,j)+(i−1,j)+(i+1,j)+(i,j−1). As described above, dir0_1=dir1_1 is established, and therefore in practice, dir1_1 does not need to be calculated again.

The gradient value dir0 of the diagonally leftward direction of a certain interpolation pixel is calculated by summing dir0_0 and dir0_1 of the certain interpolation pixel. The gradient value dir1 of the diagonally rightward direction of a certain interpolation pixel is calculated by summing dir1_0 and dir1_1 of the certain interpolation pixel.

As an example, in the enlarged image indicated in the virtual space, pixel f is located on an upper-left side of pixel K. In addition, the coordinates of pixel K are (2,2) in the partial original image. Accordingly, a portion dir0_0 of the gradient value of the diagonally leftward direction of pixel f is calculated by −3K+J+L+O.

In addition, in the enlarged image indicated in the virtual space, pixel f is located on a lower-left side of pixel F. The coordinates of pixel F are (1,1) in the partial original image. Accordingly, a portion dir0_1 of the gradient value of the diagonally leftward direction of pixel f is calculated by −3F+B+E+G.

By summing dir1_1 and dir0_1, the gradient value dir0 of the diagonally leftward direction of pixel f is calculated.

Figure 14:
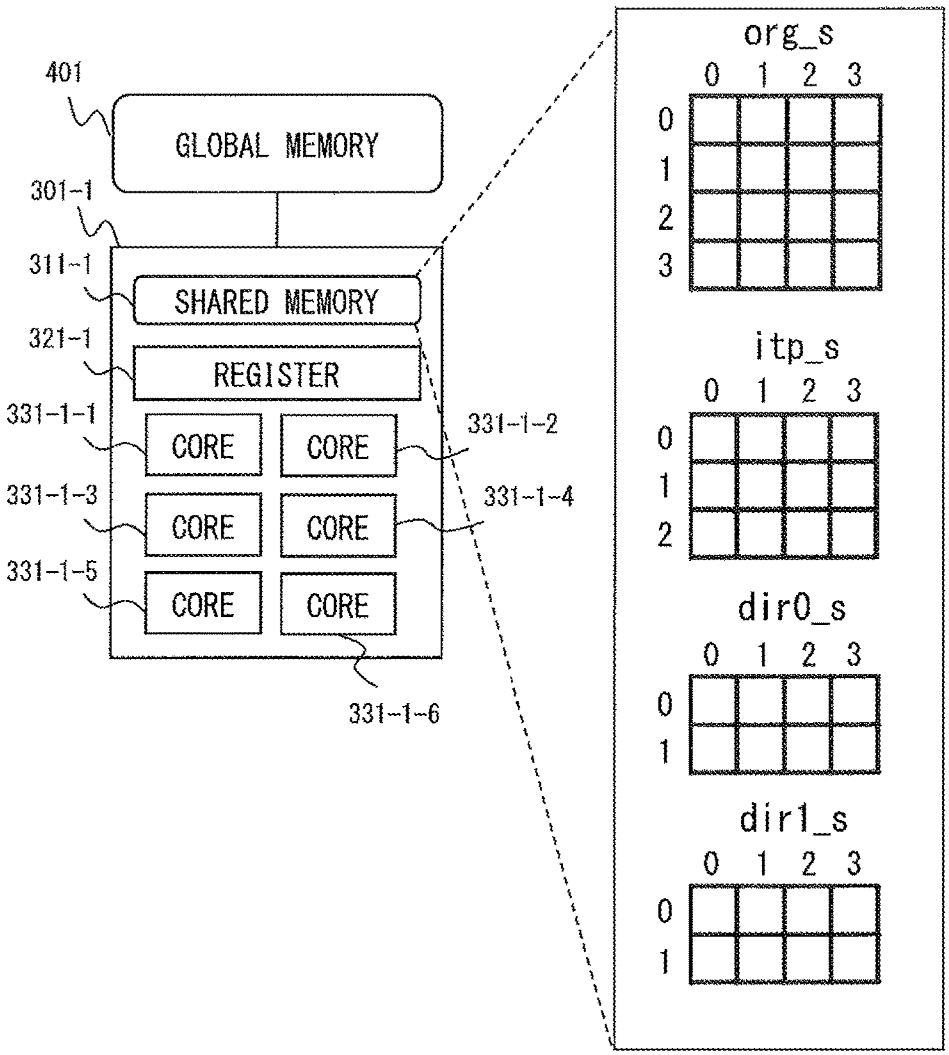
FIG. 14 illustrates details of data stored in a shared memory.

FIG. 14 illustrates details of data stored in a shared memory.

The shared memory 311-1 stores a partial original image org_s, a partial interpolation pixel itp_s, partial gradient data dir0_s, and partial gradient data dir0_s.

The partial original image org_s is data indicating a portion of the original image org. Specifically, the partial original image org_s is an image indicating four rows of the original image org.

The partial interpolation pixel itp_s indicates some pixels for which both coordinates of the coordinates (i,j) in the enlarged image en1 have odd numbers. The partial interpolation pixel itp_s includes pixels for which both coordinates of the coordinates (i,j) have odd numbers in three rows of the enlarged image en1.

The partial gradient data dir0_s is data that includes gradient values dir0 of the diagonally leftward direction that correspond to pixels in two rows of the partial interpolation pixel itp_s or values under calculation of the gradient values dir0 of the diagonally leftward direction. The partial gradient data dir0_s includes elements in two rows and M columns. Assume that the top row of the partial gradient data dir0_s is the 0th row, and that a column at a left-hand end is the 0th column.

The partial gradient data dir1_s is data that includes gradient values dir1 of the diagonally rightward direction that correspond to pixels in two rows of the partial interpolation pixel itp_s or values under calculation of the gradient values dir1 of the diagonally rightward direction. The partial gradient data dir0_s includes elements in 2 rows and M columns. Assume that the top row of the partial gradient data dir0_s is the 0th row, and that a column at a left-hand end is the 0th column.

Figure 15:
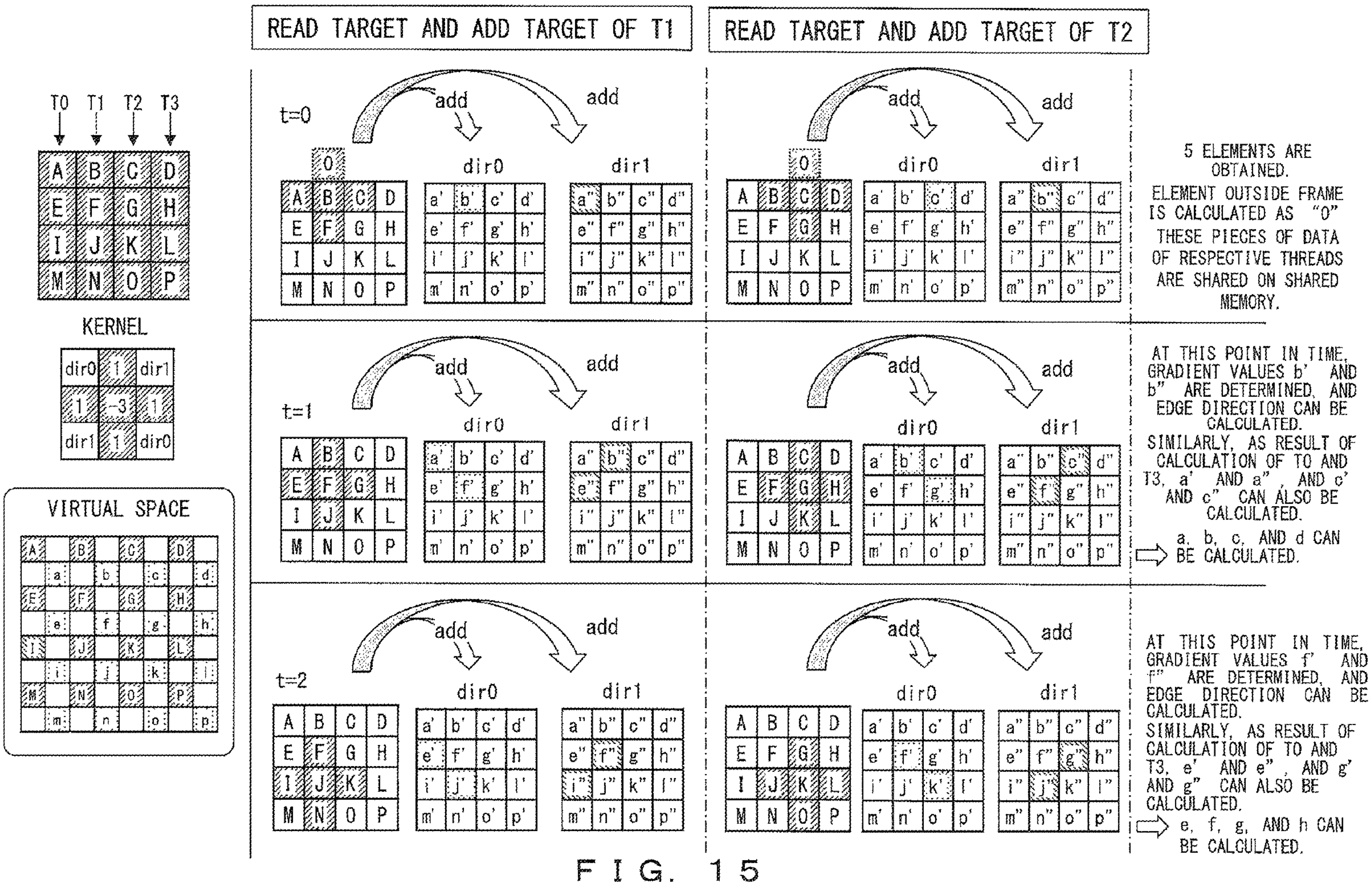
FIG. 15 illustrates a pipeline scheme of the gradient value calculation method according to the embodiment.

FIG. 15 illustrates a pipeline scheme of the gradient value calculation method according to the embodiment.

The gradient values dir0 of the diagonally leftward direction of interpolation pixels a to p in the enlarged image are respectively denoted by a' to p', and the gradient values dir1 of the diagonally rightward direction are respectively denoted by a" to p". In the description below, the values of respective elements in a matrix of the gradient values dir0 of the diagonally leftward direction, the matrix including a' to p' as elements, and a matrix of the gradient values dir1 of the diagonally rightward direction, the matrix including a" to p" as elements, are obtained. The initial values of a' to p' and a" to p" are 0.

In the embodiment, one thread is allocated to each of the columns of the partial original image org_s. At time t=x, thread Ti (i=0 to 3) calculates a portion dir0_0 of the gradient value of the diagonally leftward direction of an interpolation pixel that is located on a upper-left side of a pixel in the enlarged image that corresponds to a center pixel at the coordinates (i,x) in the partial original image org_s, by using five pixels in total that include the center pixel and four pixels that are vertically and horizontally adjacent to the center pixel. In addition, at time t=x, thread Ti (i=0 to 3) calculates a portion dir1_0 of the gradient value of the diagonally rightward direction of an interpolation pixel that is located on an upper-right side of the pixel in the enlarged image that corresponds to the center pixel. Further, at time t=x, thread Ti (i=0 to 3) calculates a portion dir0_1 of the gradient value of the diagonally leftward direction of an interpolation pixel that is located on a lower-right side of the pixel in the enlarged image that corresponds to the center pixel. Furthermore, at time t=x, thread Ti (i=0 to 3) calculates a portion dir1_1 of the gradient value of the diagonally rightward direction of an interpolation pixel that is located on a lower-left side of the pixel in the enlarged image that corresponds to the center pixel. Assume that the other pixel values in the partial original image org_s are 0.

Here, description is given focusing on threads T1 and T2.

At time t=0, thread T1 reads pixels A to C and F, calculates a portion (dir0_1) of the gradient value dir0 of pixel b and a portion (dir1_1) of the gradient value dir1 of pixel a, and adds them to b' and a", respectively. Note that dir0_1=dir1_1=−3B+0+A+C is established.

At time t=0, thread T2 reads pixels B to D and G, calculates a portion (dir0_1) of the gradient value dir0 of pixel c and a portion (dir1_1) of the gradient value dir1 of pixel b, and adds them to c' and b", respectively. Note that dir0_1=dir1_1=−3C+0+B+D is established.

At time t=1, thread T1 reads pixels B, E to G, and J, calculates a portion (dir0_1) of the gradient value dir0 of pixel a, a portion (dir0_1) of the gradient value dir0 of pixel f, a portion (dir1_0) of the gradient value dir1 of pixel b, and a portion (dir1_1) of the gradient value dir1 of pixel e, and adds them to a', f', b", and e", respectively. Note that dir0_0=dir1_0=−3F+E+G+J is established, and that dir0_1=dir1_1=−3F+B+E+G is established.

At time t=1, thread T2 reads pixels C, F to H, and K, calculates a portion (dir0_0) of the gradient value dir0 of pixel b, a portion (dir0_1) of the gradient value dir1 of pixel g, a portion (dir1_0) of the gradient value dir1 of pixel c, and a portion (dir1_1) of the gradient value dir1 of pixel f, and adds them to b', g', c", and f", respectively. Note that dir0_0=dir1_0=−3G+F+H+K is established, and that dir0_1=dir1_1=−3G+C+F+H is established.

At this point in time, gradient values b' and b" of two directions of pixel b are calculated, and the edge direction and the pixel value of pixel b can be calculated. In addition, as a result of calculation of thread T0 and T3, respective gradient values a' and a", c' and c", and d' and d" of two directions of pixels a, c, and d are also calculated, and the respective edge directions and pixel values of pixels a, c, and d can be calculated.

At time t=2, thread T1 reads pixels F, I to K, and N, calculates a portion (dir0_0) of the gradient value dir0 of pixel e, a portion (dir0_1) of the gradient value dir0 of pixel j, a portion (dir1_0) of the gradient value dir1 of pixel f, and a portion (dir1_1) of the gradient value dir1 of pixel i, and adds them to e', j', f", and i", respectively. Note that dir0_0=dir1_0=−3J+I+K+N is established, and that dir0_1=dir1_1=−3J+F+I+K is established.

At time t=2, thread T2 reads pixels G, J to L, and O, calculates a portion (dir0_0) of the gradient value dir0 of pixel f, a portion (dir0_1) of the gradient value dir0 of pixel k, a portion (dir1_0) of the gradient value dir1 of pixel g, and a portion (dir1_1) of the gradient value dir1 of pixel j, and adds them to f', k', g", and j", respectively. Note that dir0_0=dir1_0=−3K+J+L+0 is established, and that dir0_1=dir1_1=−3K+G+J+L is established.

At this point in time, gradient values f' and f" of two directions of pixel fare calculated, and the edge direction and the pixel value of pixel f can be calculated. In addition, as a result of calculation of threads T0 and T3, respective gradient values e' and e", g' and g", and h' and h" of two directions of pixels e, g, and h are calculated, and the respective edge directions and pixel values of pixels e, g, and h can be calculated.

Figure 16:
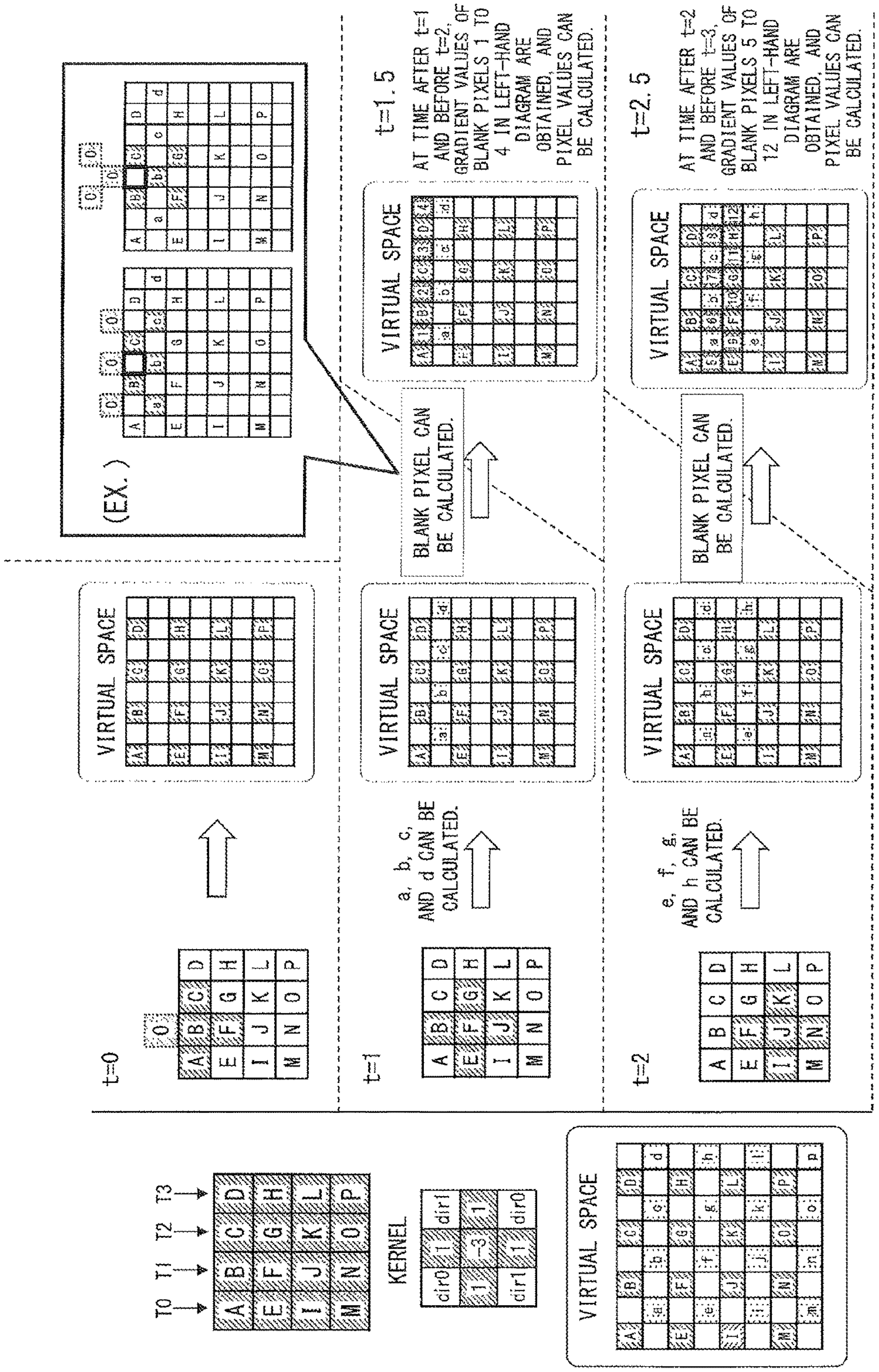
FIG. 16 illustrates a pipeline scheme of the gradient value calculation method according to the embodiment.

FIG. 16 illustrates a pipeline scheme of the gradient value calculation method according to the embodiment.

FIG. 16 illustrates processing in a case in which calculation for a blank pixel for which a pixel value has not yet been calculated in FIG. 15 is incorporated into a pipeline scheme.

At time t=0, thread T1 reads pixels A to C and F, and at time t=1, thread T1 reads pixels B, E to G, and J. At time t=1, the values of pixels a to d can be calculated. Further, at time t=1.5, the gradient values of a horizontal direction and a vertical direction of each pixel (blank pixels) in the 0th row of the enlarged image for which a pixel value has not yet been calculated, namely, pixels in the 1st, 3rd, 5th, and 7th columns, are obtained, an edge direction is determined, and the pixel value of each of the blank pixels is calculated. The pixel values of the blank pixels are stored in the register 321-1.

At time t=2, thread T1 reads pixels F, I to K, and N. At time t=2, the values of pixels e to h can be calculated. Further, at time t=2.5, the gradient values of the horizontal direction and the vertical direction of each pixel (blank pixels) in the 1st and 2nd rows of the enlarged image for which a pixel value has not yet been calculated, namely, pixels in the 0th, 2nd, 4th, and 6th columns of the 1st row and the 1st, 3rd, 5th, and 7th columns of the 2nd row of the enlarged image, are obtained, an edge direction is determined, and the pixel value of each of the blank pixels is calculated. The pixel values of the blank pixels are stored in the register 321-1.

FIG. 17 is a flowchart of FCBI using the gradient value calculation method according to the embodiment.

Assume that the arithmetic processor 301-1 performs FCBI processing. The global memory 401 stores an image (an original image) org to be enlarged, and an enlarged image en1 obtained by enlarging the original image org (FIG. 3). Assume that the size of the original image org is N pixels in height and M pixels in width. Also assume that the size of the enlarged image en1 is 2N pixels in height and 2M pixels in width. In FIG. 3, the size of the original image is 4×4 pixels, and the size of the enlarged image en1 is 8×8 pixels. In an initial state, the pixel value of each of the pixels (elements) of the enlarged image en1 is blank.

Assume that the top rows of the original image org and the enlarged image en1 are the 0th rows. Also assume that columns at the left ends of the original image org and the enlarged image en1 are the 0th columns.

In step S601, the core 331-1-*j* copies elements in the 0th row and the 1st row of org within the global memory 401 to the 0th row and the 1st row of the partial original image org_s within the shared memory 311-1.

Step S602 is a start end of a loop that corresponds to step S609, and the core 331-1-*j* sets an initial value of a variable i to 2, and i is incremented by 1 every time the loop is executed, and the loop continues to be executed until i=N+2.

In step S603, when i is smaller than N, the control moves on to step S604, and when i is greater than or equal to N, the control moves on to step S605.

In step S604, the core 331-1-*j* copies elements in the i-th row of org within the global memory 401 to the bottom row of the partial original image org_s within the shared memory 311-1. When elements in a row (for example, the 3rd row) other than the bottom row (the 4th row) of the partial original image org_s are blank, the elements in the i-th row of org are copied to the row other than the bottom row (the 4th row) in which elements are blank.

In step S605, the core 331-1-*i* interpolates the partial interpolation pixel itp_s for 2i−3 rows of the enlarged image en1 from the elements of the partial original image org_s (interpolation on a partial interpolation pixel).

The process of step S605 is described here in detail.

Figure 18:
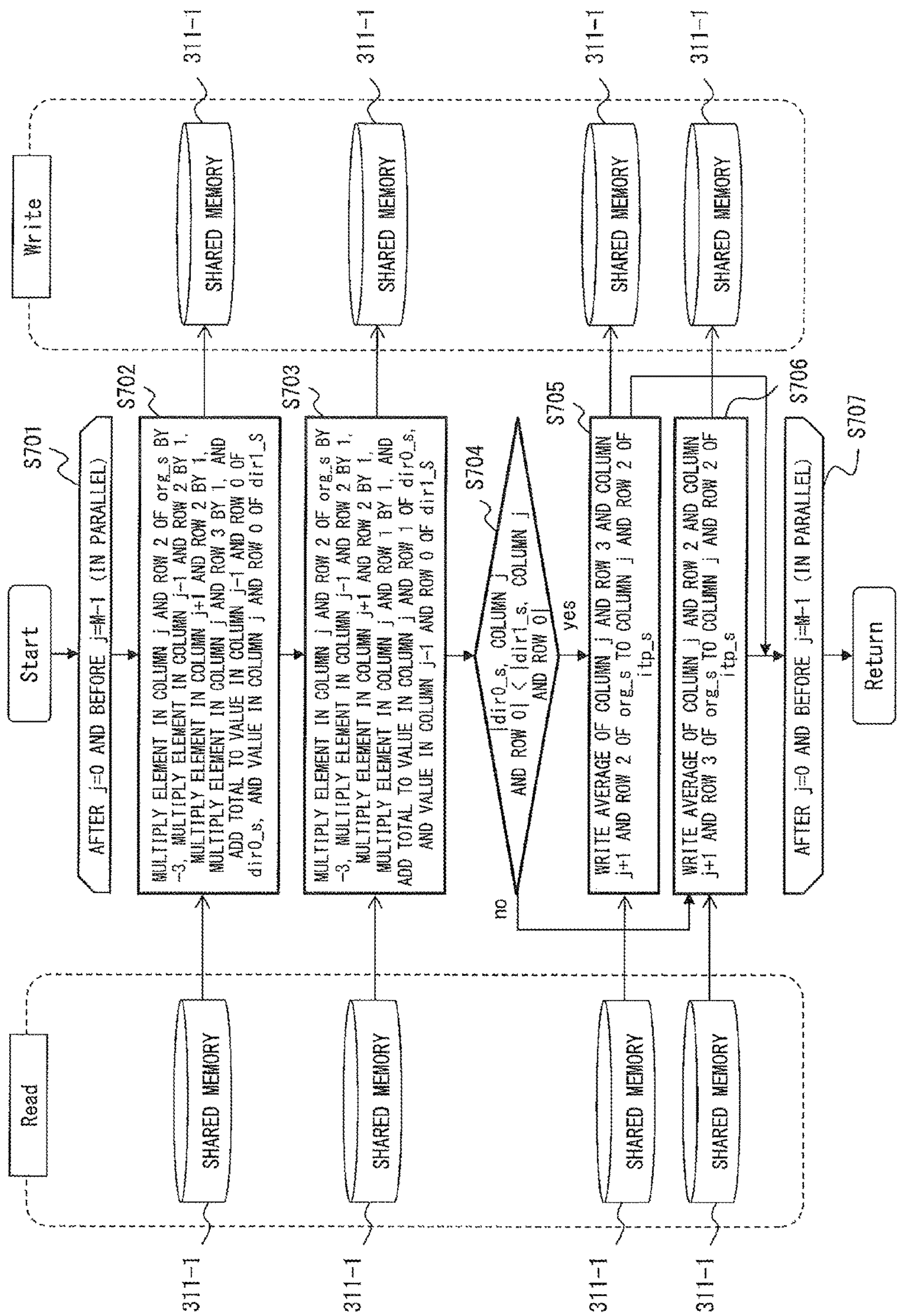
FIG. 18 is a flowchart illustrating details of processing for interpolating a partial interpolation pixel.

FIG. 18 is a flowchart illustrating details of processing for interpolating a partial interpolation pixel.

FIG. 18 corresponds to step S605.

In step S701, the core 331-1-*j* starts processing on a variable j (j=0 to M−1) in parallel.

In step S702, the core 331-1-*j* reads, from the shared memory 311-1, an element in the j-th column and the 2nd row, an element in the (j−1)th column and the 2nd row, an element in the (j+1)th column and the 2nd row, and an element in the j-th column and the 3rd row of the partial original image org_s. The core 331-1-*j* sums a value obtained by multiplying the element in the j-th column and the 2nd row of the partial original image org_s by −3, the value of the element in the (j−1)th column and the 2nd row, the value of the element in the (j+1) th column and the 2nd row, and the value of the element in the j-th column and the 3rd row, and adds the obtained value to a value in the (j−1)th column and the 0th row of the partial gradient data dir0_s and a value in the j-th column and the 0th row of the partial gradient data dir0_s within the shared memory 311-1.

In step S703, the core 331-1-*j* reads, from the shared memory 311-1, an element in the j-th column and the 2nd row, an element in the (j−1)th column and the 2nd row, an element in the (j+1)th column and the 2nd row, and an element in the j-th column and the 1st row of the partial original image org_s. The core 331-1-*j* sums a value obtained by multiplying the element in the j-th column and the 2nd row of the partial original image org_s by −3, the value of the element in the (j−1)th column and the 2nd row, the value of the element in the (j+1) th column and the 2nd row, and the value of the element in the j-th column and the 1st row, and adds the obtained value to a value in the j-th column and the 1st row of the partial gradient data dir0_s and a value in the (j−1)th column and the 0th row of the partial gradient data dir0_s within the shared memory 311-1.

In step S704, the core 331-1-*j* compares the absolute value of the element in the j-th column and the 0th row of the partial gradient data dir0_s with the absolute value of the element in the j-th column and the 0th row of the partial gradient data dir0_s, and determines which is greater. When the absolute value of a value in the j-th column and the 0th row of the partial gradient data dir0_s is smaller than the absolute value of a value in the j-th column and the 0th row of the partial gradient data dir0_s, the control moves on to step S706. When the absolute value of the value in the j-th column and the 0th row of the partial gradient data dir0_s is greater than or equal to the absolute value of the value in the j-th column and the 0th row of the partial gradient data dir0_s, the control moves on to step S705.

In step S705, the core **331-1-*j* calculates an average of the element in the j-th column and the 3rd row and the element in the (j+1)th column and the 2nd row in the partial original image org_s, and writes the average to the j-th column and the 2nd row of the partial interpolation pixel itp_s within the shared memory 311-1**.

In step S706, the core **331-1-*j* calculates an average of the element in the j-th column and the 2nd row and the element in the (j+1)th column and the 3rd row in the partial original image org_s, and writes the average to the j-th column and the 2nd row of the partial interpolation pixel itp_s within the shared memory 311-1**.

In step S707, when processing has been performed on all of variables j (j=0 to M−1), interpolation processing on the partial interpolation pixel is terminated, and the control returns to step S606.

Return now to the description of FIG. 17.

In step S606, the core **331-1-*j* interpolates the remaining elements in the (2i−5)th row and the (2i−4)th row of the enlarged image en1 on the basis of elements in the partial original image org_s and the partial interpolation pixel itp_s. Stated another way, the core 331-1-*j* calculates the pixel values of pixels in the (2i−5) th row and the (2i−4) th row of the enlarged image en1 for which a pixel value has not yet been calculated. The process of step S606 is similar to the processes of steps S508 to S510, and the horizontal-direction gradient value dir2 and the vertical-direction gradient value dir3 are calculated for each of the pixels for which the pixel value has not yet been calculated, the absolute value of the gradient value dir2 and the absolute value of the gradient value dir3 are compared with each other, an edge direction is determined, and a pixel value is calculated on the basis of the determined edge direction. The pixel values of original image org and the pixel values of interpolation pixels for which a pixel value has been calculated that are needed to calculate a gradient value and a pixel value exist in the partial original image org_s and the partial interpolation pixel itp_s, and therefore the core 331-1-*j* reads pixel values needed for calculation from the shared memory 311-1**.

In step S607, the core **331-1-*j* reads elements that correspond to interpolation pixels in the (2i−5) th row and the (2i−4) th row of the enlarged image en1 from the shared memory 311-1 and the register 321-1, and the core 331-1-*j* copies the elements to the (2i−5) th row and the (2i−4) th row of the enlarged image en1 within the global memory 401-1**.

In step S608, the core **331-1-*j* shifts elements in respective rows of the partial original image org_s, the partial interpolation pixel itp_s, the partial gradient data dir0_s, and the partial gradient data dir1_s upward by one row. Stated another way, elements in the 0th rows of the partial original image org_s, the partial interpolation image itp_s, the partial gradient data dir0_s, and the partial gradient data dir1_s are deleted, and elements in the 1st rows become elements in the 0th rows. Similarly, elements in the 2nd rows become elements in the 1st rows, elements in the 3rd rows become elements in the 2nd rows, and elements in the 4th rows become elements in the 3rd rows. When a row including a blank element exists in the partial original image org_s, the partial interpolation pixel itp_s, the partial gradient data dir0_s, and the partial gradient data dir1_s, a shift is not performed on data including a row in which an element is blank. By doing this, the size of data stored in the shared memory 311-1 is reduced, and the size of the data stored in the shared memory 311-1 is prevented from becoming greater than the capacity of the shared memory 311-1**.

In step S609, when i is greater than N+2, the processing is terminated, and when i is smaller than or equal to N+2, the control returns to step S602.

Figure 19:
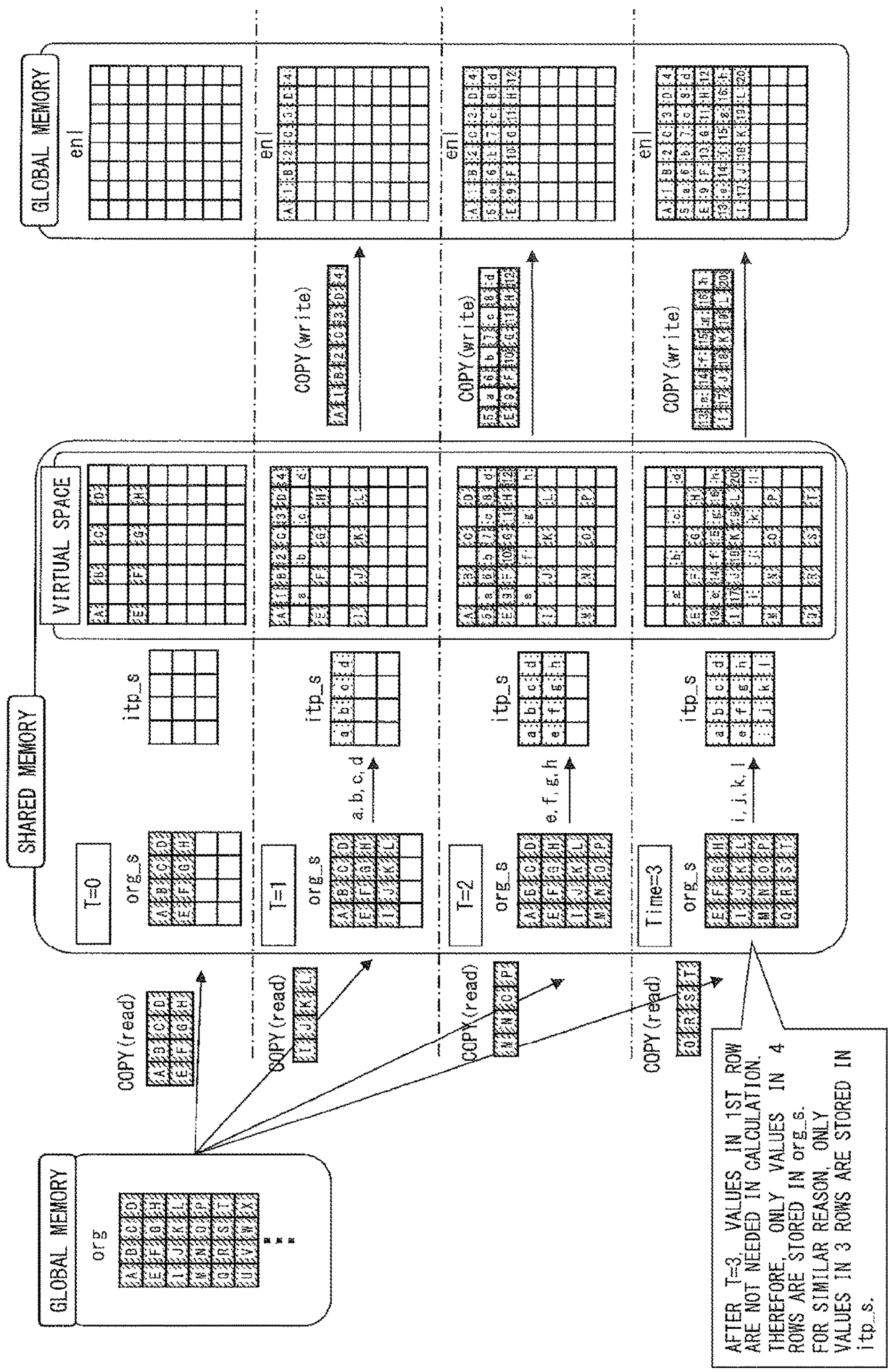
FIG. 19 illustrates time and data in each memory.

FIG. 19 illustrates time and data in each memory.

The original image org of FIG. 19 is an image that also indicates the 3rd row and the subsequent rows of the original image org described with reference to FIG. 4. Pixels in the 0th to 3rd columns of the 4th row of the original image org are respectively referred to as pixels Q to T. Pixels in the 0th to 3rd columns of the 5th row of the original image org are respectively referred to as pixels U to X.

For ease of understanding, respective elements of org_g and the partial interpolation pixel itp_s in an enlarged image are indicated in a virtual space of the shared memory 311-1.

At time T=0, elements in the 1st row and the 2nd row of the original image org within the global memory 401 are copies to the 1st row and the 2nd row of the partial original image org_s within the shared memory 311-1 (step S601).

At time T=1, elements in the 3rd row of the original image org within the global memory 401 are copied to the 3rd row of the partial original image org_s within the shared memory 311-1 (step S604). Elements in the 1st row of the partial interpolation pixel itp_s are calculated, and are stored in the 1st row of the partial interpolation pixel itp_s (step S605). Further, a pixel value is calculated for each of pixels in the 0th row of the enlarged image en1 for which a pixel value has not yet been calculated (step S606). Namely, a pixel value is calculated for each of pixels in the 1st, 3rd, 5th, and 7th columns of the 0th row in the enlarged image en1. The pixels in the 1st, 3rd, 5th, and 7th columns of the 0th row in the enlarged image en1 are referred to as pixels 1 to 4. Pixels A to D and pixels 1 to 4, which are elements in the 0th row of the enlarged image en1, are copied to the 0th row of the enlarged image en1 within the global memory 401 (step S607).

At time T=2, elements in the 4th row of the original image org within the global memory 401 are copied to the 4th row of the partial original image org_s within the shared image 311-1 (step S604). In addition, elements in the 2nd row of the partial interpolation pixel itp_s are calculated, and are stored in the 2nd row of the partial interpolation pixel itp_s (step S605). Further, a pixel value is calculated for each of pixels in the 1st row and the 2nd row of the enlarged image en1 for which a pixel value has not yet been calculated (step S606). Namely, a pixel value is calculated for each of pixels in the 0th, 2nd, 4th, and 6th columns of the 1st row and the 1st, 3rd, 5th, and 7th columns of the 2nd row of the enlarged image en1. Pixels in the 0th, 2nd, 4th, and 6th columns of the 1st row of the enlarged image en1 are respectively referred to as pixels 5 to 8. Pixels in the 1st, 3rd, 5th, and 7th columns of the 2nd row of the enlarged image en1 are respectively referred to as pixels 9 to 12. Pixels a to d and pixels 5 to 8, which are elements in the 1st row of the enlarged image eng, are copied to the 1st row of the enlarged image en1 within the global memory 401, and pixels E to H and pixels 9 to 12, which are elements in the 2nd row of the enlarged image en1, are copied to the 2nd row of the enlarged image en1 within the global memory 401 (step S607). Respective rows of the partial original image org_s are shifted upward by one row (step S608).

At time T=3, elements in the 5th row of the original image org within the global memory 401 are copied to the 4th row of the partial original image org_s within the shared memory 311-1 (step S604). Elements in the 3rd row of the partial interpolation pixel itp_s are calculated, and are stored in the 3rd row of the partial interpolation pixel itp_s (step S605). Further, a pixel value is calculated for each of pixels in the 3rd row and the 4th row of the enlarged image en1 for which a pixel value has not yet been calculated (step S606). Stated another way, pixels in the 0th, 2nd, 4th, and 6th columns of the 3rd row and pixels in the 1st, 3rd, 5th, and 7th columns of the 4th row of the enlarged image en1 are calculated. The pixels in the 0th, 2nd, 4th, and 6th of the 3rd row of the enlarged image en1 are respectively referred to as pixels 13 to 16. The pixels in the 1st, 3rd, 5th, and 7th columns of the 4th row of the enlarged image en1 are respectively referred to as pixels 17 to 20. Pixels e to h and pixels 13 to 16, which are elements in the 3rd row of the enlarged image en1, are copied to the 3rd row of the enlarged image en1 within the global memory 401, and pixels I to L and pixels 17 to 20, which are elements in the 4th row of the enlarged image en1, are copied to the 4th row of the enlarged image en1 within the global memory 401 (step S607).

By employing the GPU according to the embodiment, the number of accesses to a global memory can be reduced, and the speed of FCBI processing can be increased by reducing an amount of data read from the global memory.

In addition, the gradient value calculation method according to the embodiment can be applied to iterative curvature-based interpolation (ICBI).

FIG. 20 is a block diagram of an information processing device (a computer).

A GPU 101 according to the embodiment is mounted on, for example, the information processing device (the computer) 1 illustrated in FIG. 20.

The information processing device 1 includes a CPU 2, a memory 3, an input device 4, an output device 5, a storage 6, a recording medium drive unit 7, a network connecting device 8, and a GPU 101, and these components are connected to each other via a bus 9.

The CPU 2 is a central processing unit that controls the entirety of the information processing device 1.

The memory 3 is a memory, such as a read-only memory (ROM) or a random access memory (RAM), that transitorily stores a program or data stored in the storage 6 (or a portable recording medium 10) when the program is executed.

The input device 4 is used, for example, to input an instruction or information from a user or an operator, or to obtain data used in the information processing device 1. The input device 4 is, for example, a keyboard, a mouse, a touch panel, a camera, a sensor, or the like.

The output device 5 is a device that outputs an inquiry to a user or an operator, or a processing result, or that operates under the control of the CPU 2. The output device 5 is, for example, a display device, a printer, or the like.

The storage 6 is, for example, a magnetic disk device, an optical disk device, a tape device, or the like. The information processing device 1 stores the program and data described above in the storage 6, and the information processing device 1 reads them into the memory 3 as needed, and uses them.

The recording medium drive unit 7 drives the portable recording medium 10, and accesses its recording content. As the portable recording medium, an arbitrary computer-readable recording medium, such as a memory card, a flexible disk, a compact disk read-only memory (CD-ROM), an optical disk, or a magneto-optical disk, is used. A user stores the program and data described above in the portable recording medium 10, and the user reads them into the memory 3 as needed, and uses them.

The network connecting device 8 is a communication interface that is connected to an arbitrary communication network such as a local area network (LAN) or a wide area network (WAN), and that performs data conversion associated with communication. The network connecting device 8 transmits data to a device connected via the communication network, or receives data from the device connected via the communication network.

The GPU 101 performs FCBI processing using the gradient value calculation method described above. In addition, the GPU 101 performs display processing on the output device 5, which is a display device. The GPU 101 may perform various types of processing described above by executing a program by using the memory 3. In this case, a program code itself that is read from the portable recording medium 10 or the like implements the functions according to the embodiment above.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
- a first memory that stores an original image and an enlarged image obtained by enlarging the original image; and
- a processor, wherein
- the processor includes
  - an arithmetic circuit that calculates a first gradient value used to determine an edge direction of an interpolation pixel within the enlarged image from respective pixel values of a plurality of first pixels in the original image, and calculates a second gradient value used to determine the edge direction from respective pixel values of a plurality of second pixels in the original image; and
  - a second memory that stores the first gradient value and the second gradient value, and
- the arithmetic circuit performs:
  - reading the original image in prescribed data units from the first memory;
  - calculating a first value from respective pixel values of a plurality of third pixels that are located above the interpolation pixel from among the plurality of first pixels, when the plurality of third pixels are read;
  - calculating a second value from respective pixel values of a plurality of fourth pixels that are located above the interpolation pixel from among the plurality of second pixels, when the plurality of fourth pixels are read;
  - after calculating the first value and the second value, reading a plurality of pixels in the original image that are located below the interpolation pixel in the prescribed data units from the first memory;
  - calculating a third value from respective pixel values of a plurality of fifth pixels that are located below the interpolation pixel from among the plurality of first pixels, when the plurality of fifth pixels are read;

calculating a fourth value from respective pixel values of a plurality of sixth pixels that are located below the interpolation pixel from among the plurality of second pixels, when the plurality of sixth pixels are read;

calculating the first gradient value by adding the third value to the first value;

calculating the second gradient value by adding the fourth value to the second value;

determining the edge direction according to the first gradient value and the second gradient value; and calculating a pixel value of the interpolation pixel according to the edge direction.

2. The information processing device according to claim 1, wherein the second memory stores a partial image that is a portion of the original image that has been read, the arithmetic circuit adds, to the partial image, data that has been read in the prescribed data units from the original image, and before the original image is next read in the prescribed data units from the first memory, data included in the partial image is deleted in the prescribed data units in order of oldest first.

3. The information processing device according to claim 1, wherein the arithmetic circuit calculates a plurality of gradient values used to determine the edge directions of another plurality of interpolation pixels by using the first value, the second value, the third value, and the fourth value.

4. An information processing method performed by an information processing device that includes a first memory that stores an original image and an enlarged image obtained by enlarging the original image, and a processor, the processor including an arithmetic circuit that calculates a first gradient value used to determine an edge direction of an interpolation pixel within the enlarged image from respective pixel values of a plurality of first pixels in the original image, and calculates a second gradient value used to determine the edge direction from respective pixel values of a plurality of second pixels in the original image, and a second memory that stores the first gradient value and the second gradient value, the information processing method comprising:

reading the original image in prescribed data units from the first memory;

calculating a first value from respective pixel values of a plurality of third pixels that are located above the interpolation pixel from among the plurality of first pixels, when the plurality of third pixels are read;

calculating a second value from respective pixel values of a plurality of fourth pixels that are located above the interpolation pixel from among the plurality of second pixels, when the plurality of fourth pixels are read;

after calculating the first value and the second value, reading a plurality of pixels in the original image that are located below the interpolation pixel in the prescribed data units from the first memory;

calculating a third value from respective pixel values of a plurality of fifth pixels that are located below the interpolation pixel from among the plurality of first pixels, when the plurality of fifth pixels are read;

calculating a fourth value from respective pixel values of a plurality of sixth pixels that are located below the interpolation pixel from among the plurality of second pixels, when the plurality of sixth pixels are read;

calculating the first gradient value by adding the third value to the first value;

calculating the second gradient value by adding the fourth value to the second value;

determining the edge direction according to the first gradient value and the second gradient value; and calculating a pixel value of the interpolation pixel according to the edge direction.

5. The information processing method according to claim 4, further comprising;

storing, in the second memory, a partial image that is a portion of the original image that has been read;

in the reading the original image, adding read data to the partial image, and before the original image is next read in the prescribed data units from the first memory, deleting data included in the partial image in the prescribed data units in order of oldest first.

6. The information processing method according to claim 4, further comprising:

calculating a plurality of gradient values used to determine the edge directions of another plurality of interpolation pixels by using the first value, the second value, the third value, and the fourth value.

7. A non-transitory storage medium having stored therein a program for causing a computer to execute a process, the computer including a first memory that stores an original image and an enlarged image obtained by enlarging the original image, and a processor, the processor including an arithmetic circuit that calculates a first gradient value used to determine an edge direction of an interpolation pixel within the enlarged image from respective pixel values of a plurality of first pixels in the original image, and calculates a second gradient value used to determine the edge direction from respective pixel values of a plurality of second pixels in the original image, and a second memory that stores the first gradient value and the second gradient value, the process comprising:

reading the original image in prescribed data units from the first memory;

calculating a first value from respective pixel values of a plurality of third pixels that are located above the interpolation pixel from among the plurality of first pixels, when the plurality of third pixels are read;

calculating a second value from respective pixel values of a plurality of fourth pixels that are located above the interpolation pixel from among the plurality of second pixels, when the plurality of fourth pixels are read;

after calculating the first value and the second value, reading a plurality of pixels in the original image that are located below the interpolation pixel in the prescribed data units from the first memory;

calculating a third value from respective pixel values of a plurality of fifth pixels that are located below the interpolation pixel from among the plurality of first pixels, when the plurality of fifth pixels are read;

calculating a fourth value from respective pixel values of a plurality of sixth pixels that are located below the interpolation pixel from among the plurality of second pixels, when the plurality of sixth pixels are read;

calculating the first gradient value by adding the third value to the first value;

calculating the second gradient value by adding the fourth value to the second value;

determining the edge direction according to the first gradient value and the second gradient value; and calculating a pixel value of the interpolation pixel according to the edge direction.

8. The non-transitory storage medium according to claim 7, further comprising:

storing, in the second memory, a partial image that is a portion of the original image that has been read;

in the reading the original image, adding read data to the partial image, and before the original image is next read in the prescribed data units from the first memory, deleting data included in the partial image in the prescribed data units in order of oldest first.

9. The non-transitory storage medium according to claim 7, further comprising:

calculating a plurality of gradient values used to determine the edge directions of another plurality of interpolation pixels by using the first value, the second value, the third value, and the fourth value.

* * * * *